United States Patent [19]

Davis et al.

[11] Patent Number: 4,991,169

[45] Date of Patent: Feb. 5, 1991

[54] REAL-TIME DIGITAL SIGNAL PROCESSING RELATIVE TO MULTIPLE DIGITAL COMMUNICATION CHANNELS

[75] Inventors: Gordon T. Davis; Michael G. Ho Lung; Baiju D. Mandalia, all of Boca Raton; Roland J. Millas, Coral Gables; Oscar E. Ortega, Miami; Rafael J. Picon; Loran R. Queen, both of Boca Raton, all of Fla.; Richard H. Robinson, Dunwoody, Ga.; William R. Robinson, Jr., West Palm Beach; Leo A. Sharp, Jr.; Jan W. van den Berg, both of Boca Raton, all of Fla.

[73] Assignee: International Business Machines Corporation, Armonk, N.Y.

[21] Appl. No.: 227,832

[22] Filed: Aug. 2, 1988

[51] Int. Cl.$^5$ .............................................. H04J 3/00
[52] U.S. Cl. ...................................... 370/77; 370/58.1
[58] Field of Search .......................... 370/77, 79, 70, 58

[56] References Cited

U.S. PATENT DOCUMENTS

| | | | |
|---|---|---|---|
| Re. 29,460 | 10/1977 | Mills | 364/724 |
| 3,578,915 | 5/1971 | LeGoffle | 179/15 BY |
| 3,761,619 | 9/1973 | Pommerening | 179/15 AT |
| 3,978,290 | 8/1976 | Sarma | 179/15 AT |
| 4,013,842 | 3/1977 | Kao et al. | 179/15 FD |
| 4,125,745 | 11/1978 | Steidl | 179/15 BY |
| 4,133,979 | 1/1979 | Helliwell et al. | 179/15 BY |
| 4,143,242 | 3/1979 | Horiki | 179/15 BW |
| 4,191,857 | 3/1980 | McClaughlin et al. | 179/15 BY |
| 4,201,893 | 5/1980 | McClaughlin | 370/58 |
| 4,202,035 | 5/1980 | Lane | 364/200 |
| 4,203,008 | 5/1980 | Cohn-Sfetcu | 370/50 |
| 4,205,203 | 5/1980 | Mehta et al. | 370/110 |
| 4,281,410 | 7/1981 | Agricola et al. | 370/110 |
| 4,347,601 | 8/1982 | Schmidt | 370/58 |
| 4,377,849 | 3/1983 | Dunning et al. | 370/58 |
| 4,388,718 | 6/1983 | Gerke et al. | 370/110 |
| 4,394,757 | 7/1983 | Muzumdar et al. | 370/100 |
| 4,399,536 | 8/1983 | Metz | 370/110.3 |
| 4,406,004 | 9/1983 | Hall et al. | 370/15 |
| 4,425,640 | 1/1984 | Philip et al. | 370/58 |
| 4,425,641 | 1/1984 | French et al. | 370/64 |
| 4,433,425 | 2/1984 | de Jaeger | 375/113 |
| 4,597,074 | 6/1986 | Demichelis et al. | 370/79 |
| 4,823,342 | 4/1989 | Morita et al. | 370/79 |

OTHER PUBLICATIONS

H. E. White, "A T1-Based DSP Modem for Interfacing Voice and Packet Networks", IEEE Proceedings Mar. 1988, pp. 374-378.

P. Thomas, "The Design and Implementation of a CCITT V.32 Microprocessor", Proceedings of the IEE International Conference on Communications, 1987, pp. 12.5.1 to 12.5.4.

Primary Examiner—Douglas W. Olms
Assistant Examiner—Christopher O. Edwards
Attorney, Agent, or Firm—Robert Lieber; John C. Smith

[57] ABSTRACT

A dual digital signal processor (DSP) provides real time links between multiple time division channels of a digital carrier system (e.g. T-1) and a host data processor. Operating only on digital signals, internally and at its interfaces to the carrier and host systems, the DSP exchanges data and control signalling information with the carrier system and data and control information with the most processor, converting the data in passage to different digital forms. At the interface to the carrier system, signals are received and transmitted in a form adapted to diverse terminal equipment of users remotely linked to the carrier system via the switched public network. At the host interface, signals are transferred and received in a form suited to the data process requirements of the host system (e.g. data bytes directly representing alphanumeric characters). Thus, the DSP acts as the equivalent of multiple different types of modems in performing required conversions. The DSP may also perform processing services in order to reduce the processing burden on the host system (e.g. parity checking of data, detection of specific character functions in data or specific tones in audio signals, selective routing of voice to host storage for voice mail applications, etc.).

14 Claims, 12 Drawing Sheets

| Address I-RAM | P1 | P2 | P1 | P2 | P1 | P2 | P1 | P2 |
|---|---|---|---|---|---|---|---|---|
| Read Instr. |  | P1 | P2 | P1 | P2 | P1 | P2 | P1 |
| Decode Instr. |  |  | P1 | P2 | P1 | P2 | P1 | P2 |
| Form Dat Address |  |  |  | P1 | P2 | P1 | P2 | P1 |
| Address D-RAM |  |  |  |  | P1 | P2 | P1 | P2 |
| Rd/Wr Data |  |  |  |  |  | P1 | P2 | P1 |

Time ———>

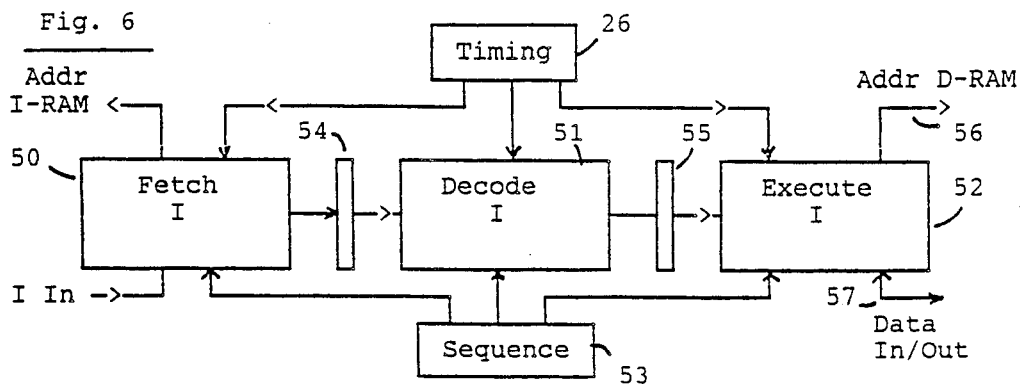
Fig. 6
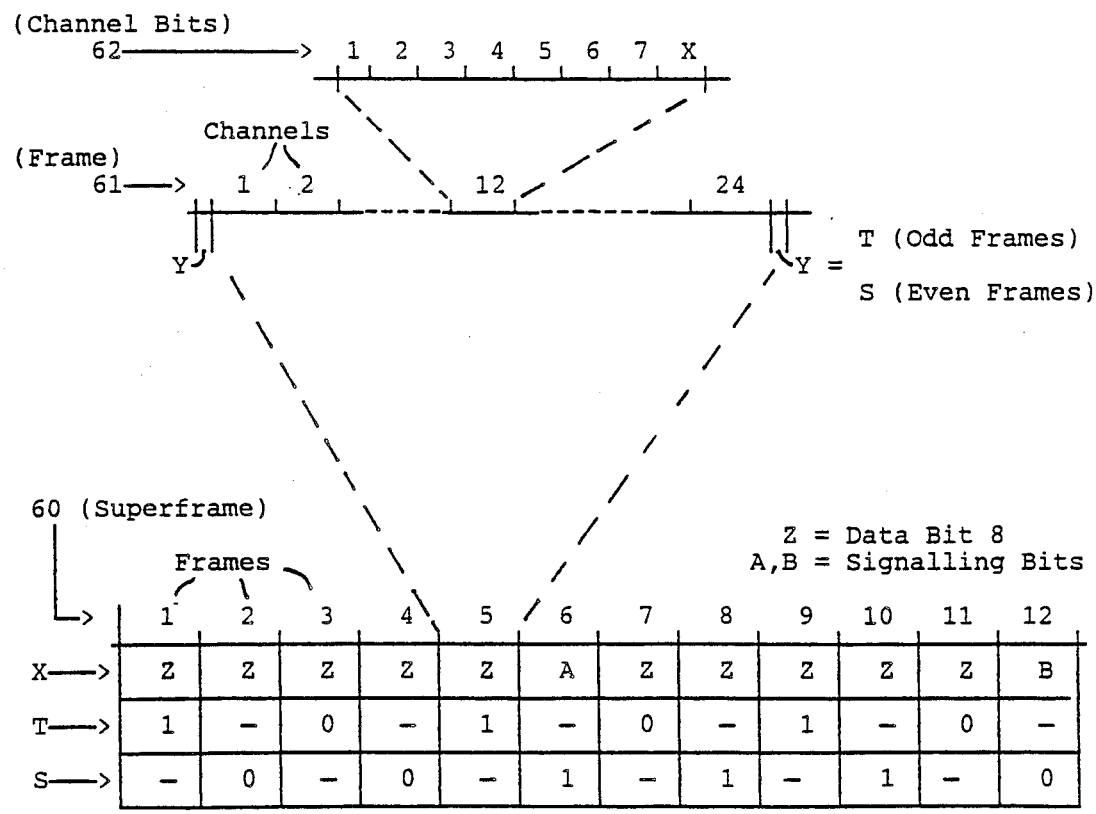
Fig. 7 (T-1 Frame Format)

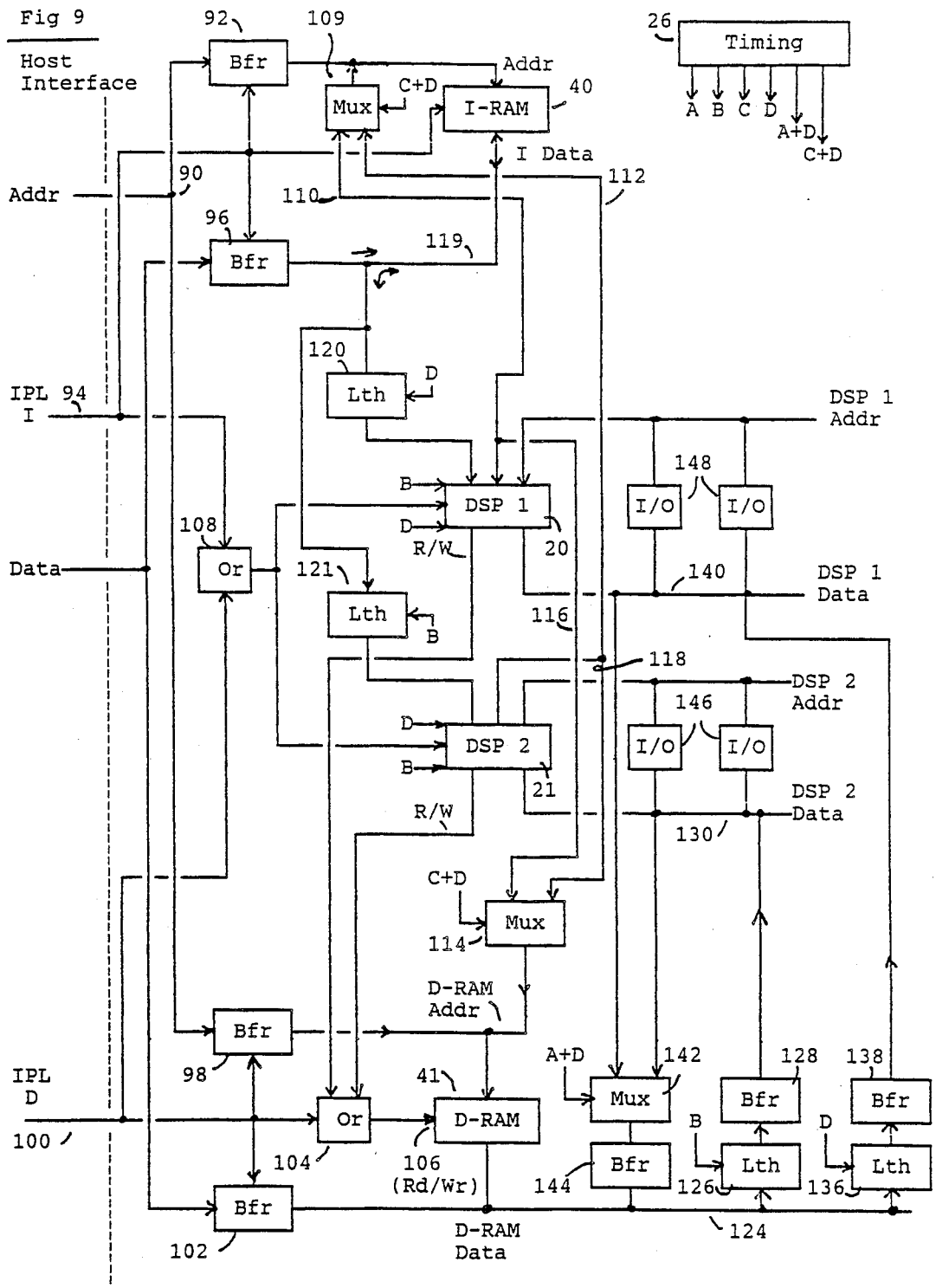

* Offset Counts track FIFO bfr occupancy, so that offset Rcv/Xmit chl counts correspond to data next out from/in to FIFO Rcv/Xmit buffers

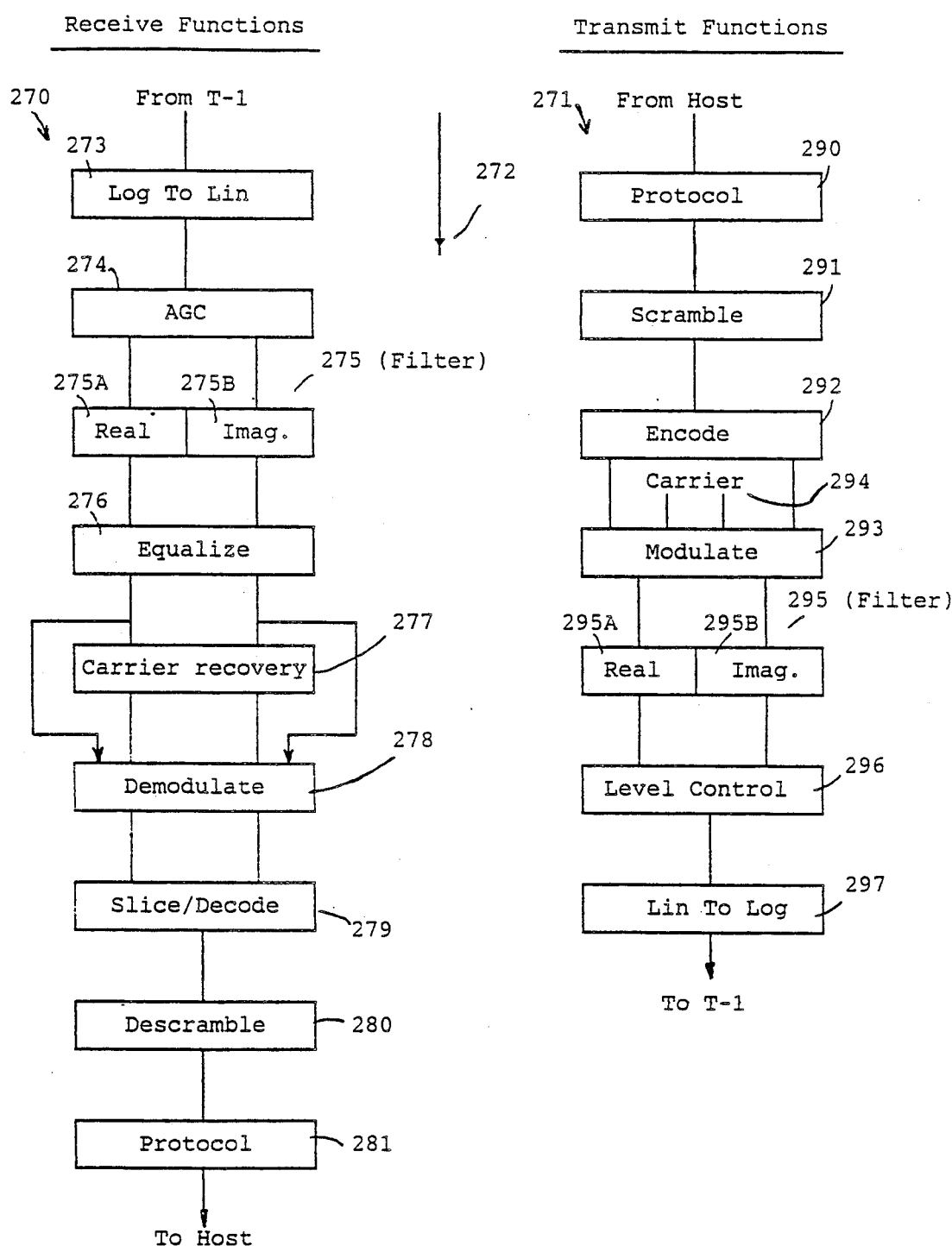
Fig. 15 (Example of Coherent Phase Shift Keyed Modem)

REAL-TIME DIGITAL SIGNAL PROCESSING RELATIVE TO MULTIPLE DIGITAL COMMUNICATION CHANNELS

BACKGROUND OF THE INVENTION

1. Related Patent Applications

Patent application Ser. No. 876,625 by G. Davis et al, filed 6/20/86 and entitled "Digital Signal Processor With Dual CPU's Sharing Common Memory", discloses certain aspects of a digital signal processing system which can be used to implement the present invention. Parts of that application are incorporated into the following detailed description by this and subsequent references.

Patent application Ser. No. 723,991 by D. Esteban et al, filed 4/15/85 and entitled "Three Phased Pipelined Signal Processor", discloses other aspects of the digital signal processing system mentioned above pertaining to the pipelined organization of instruction execution. Parts of that application are also incorporated herein by this and subsequent references.

U.S. Pat. No. 4,899,366 by G. T. Davis et al, entitled "Tap Rotation In Fractionally Spaced Equalizer To Compensate For Drift Due To Fixed Sample Rate", discloses an equalizer scheme having particular suitability for application in modem receiver sections of the present system. The disclosure of that application is also incorporated herein by this and subsequent references.

2. Field of the Invention

This invention relates to provision of information services from digital data processing centers to diversely equipped users, through the switched public telecommunication and telephone networks, using only digital processing equipment at the centers and without dedicating equipment and/or communication circuits at such centers for adapting to the diversity of user equipment. With this invention, signals flow between the processing center and time channels of a digital carrier trunk system, such as T-1, and between the trunk system and remote users via the public network. In transit between the center and the trunk, signals are processed with all-digital modem transformations for adapting to diversity of user equipment.

The invention also concerns a digital signal processing system for interfacing between the center and trunk to perform the above-mentioned transformations in an efficient real time manner.

3. Prior Art

Digital signal processors have been used for linking multiplex communication systems operating on different parameters. U.S. Pat. No. 4,013,842 discloses an arrangement of this type in which digital signal processing is used to perform digital filtering functions between channels of time division and frequency division systems, thereby avoiding any need for down-converting signals from either system to voiceband.

Such processors have also been considered for use between single communication lines and data processing centers for transforming speech and data signals between voiceband and processable forms with benefits of reduced circuit size and cost.

However, the art does not seem to have noticed the problem presently addressed; i.e. the need for providing information communication services via the public switched network to remote users having diverse analog and digital signalling equipment, without having to dedicate circuits and equipment for matching signals sent and received by the information provider with signalling characteristics of user equipment, and without having to provide conversions of individual user signals between analog and digital forms.

What appears not to have been recognized or appreciated by those skilled in the art is that equipment and/or communication circuits need not be dedicated for such adaptation, and that equivalent effects can be obtained from all-digital equipment variably allocated in time to handle modem conversions of diverse forms on an as needed basis.

More specifically, present users of public communication networks have diverse terminal equipment for transmitting and receiving various forms of information (alphanumeric data, image data, voice, etc.) in various signal forms (e.g. speech in analog form, speech and/or modem data in log PCM digital form, data in analog form modulating sinusoidal carrier oscillations as transmitted by Bell 212A DataSet equipment, data in various digital forms associated with protocol standards such as x.21, x.25, v.24, etc.). Providers of information services (e.g. search databases) generally link to dial up subscribers either through dedicated transmission circuits and dedicated equipment associated with the type of equipment located at the user terminal, or through common equipment and variably allocated transmission circuits but with special signal form conversions performed by an intermediate carrier.

For the information provider, neither method is very efficient. Dedicated circuits and special terminal equipment to match user equipment, and/or special form conversion handling by a carrier, are costly; so costs must be passed on to the user making the information service less attractive and marketable than it otherwise could be. Dedicated circuits and equipment tend not to be occupied to capacity at all times, and are therefore inefficient. Furthermore, such arrangements are difficult to adapt to new types of service such as integrated handling of voice mail with data, or integrated handling of video conferencing services with data, etc.

Recognizing the value of and need for being able to adapt to such diverse usage of digital trunks, we have devised an adapting system and method which constitute the present invention. This system can provide not only all-digital signal form conversions of different types (through undedicated digital processing circuits), but also it can support integrated all-digital handling of voice and data and provide additional processing activities relative to data with added cost saving benefits.

SUMMARY OF THE INVENTION

The present invention concerns a digital data processing system for providing information telecommunication services relative to multiple diversely equipped user terminals through high speed digital carrier facilities in the public telecommunication network, and for performing real-time all-digital conversions of signals relative to channels of the digital carrier so as to transmit and receive information in forms associated with user terminal equipment while maintaining the same information internally in forms best suited for efficient process handling.

The present system links to end users or customers through variably allocatable time division channels of a digital carrier system—e.g. North American T-1 or comparable European facilities operating under standards defined by the CEPT (Conference of European Postal and Telecommunications Administrators)—and accommodates to a large variety of equipment at user terminals with associated all-digital conversions. In addition to cost savings in the avoidance of dedicated circuitry, the invention allows for merged handling of data and voice services (e.g. voice mail storage and forwarding), and allows for growth to accommodate other services without changing its basic structure.

This system includes digital signal processing (DSP) and host processing subsystems. The DSP interfaces between the host and digital carrier channels and performs the all-digital conversions mentioned above. The host provides basic information handling services which the user requires. In addition to modem conversions, the DSP may be adapted to other processing services to reduce processing loads on the host, and thereby allow more efficient operation of both subsystems. Relative to the carrier system, the DSP receives and transmits signals in digital forms directly adapted to user equipment (so that after conversion between digital and analog forms the signals correspond directly to what is sent or receivable at user terminals). Relative to the host, the DSP transmits and receives signals in forms commensurate with host processing requirements. Thus, for instance, incoming signals representing alphanumeric data might be received in log PCM form from a user employing a Bell 212A Data set (such signals representing digitized samples of a modulated reference oscillation), and converted into code bytes directly representing character symbols. As another example, incoming signals representing quantized speech samples in log PCM form could be converted into Linear Predictive Code (LPC) form suitable for compact storage at the host (as for voice mail applications).

The DSP features dual pipelined signal processors, one interfacing with the host system, the other with the digital carrier trunk, and both cooperating to perform digital signal conversion functions.

A feature of these signal processors is that they are adaptable through various microprogram loads provided by the host subsystem to perform the various digital modem conversions associated with adapting to user equipment diversity at the trunk interface, as well as other signal form conversions and "value-added" processing relative to the host interface which tend to present information to the host system in a form more directly suited to processing by the latter system, while offloading from the host corresponding processing operations.

Examples of "value-added" functions performable in the DSP are: decoding of control information received from control signalling sub-channels of the carrier system, recognition of specific tones in speech channels, synthesis of tones and insertion of such into speech channels, etc.

Another feature is that memory shared by the dual signal processors, using the access method described in the above cross referenced patent application by Davis et al, is configured logically as circular buffers offering special advantages in respect to handling the above-mentioned form conversions. A related feature is that such circular buffers can have varied lengths tailored to the needs of conversion processes to which they are allocated. Another feature is that a buffer currently allocated to one carrier channel can be adapted to support both modem and digital filtering conversion processes relative to that channel.

Another feature is that the shared memory is organized into separately accessible instruction storage and data storage sections, and that parts of the data storage section are configured logically as said circular buffers.

Other features relate to methods by which information is exchanged between the signal processors and the digital carrier and host interfaces without formal interruptions of the signal processors.

These and other features, advantages and benefits of the present invention may be more fully understood by considering the following description and claims.

DESCRIPTION OF THE DRAWINGS

FIG. 6 illustrates the pipelined organization of each processing section of a DSP system.

FIG. 7 illustrates frame and superframe timing on the digital carrier T-1 system to which the DSP connects.

FIG. 9 schematically illustrates logical organization features of the subject DSP system.

FIG. 14A illustrates how signals are exchanged between the DSP processors and the host, FIG. 14B shows how the two processors of the DSP exchange signals. FIG. 14C shows how signals are exchanged between the DSP and the T-1 interface.

FIG. 15 illustrates how the subject system performs modem conversions; to transform digital data between the log PCM format required by the T-1 system (digitized samples of analog modem signals) and the direct representational form most effectively handled by the host system (in which the digits represent character or symbol intelligence directly).

CONTENTS

Description of Preferred Embodiment
1. Introduction
2. DSP Organization—General
3. T-1 System Timing
4. DSP Operations—General
5. DSP Organization—Details
6. DSP Timing
6.1. DSP vs T-1 Timing
7. I-RAM/D-RAM Usage
8. DSP Initialization
9. DSP/Host Interface
10. DSP/DSP Interface
11. DSP/T-1 Interface
12. DSP Data Conversions
12.1 Voice Band Data Modems
12.2 Non-coded Data (Pictures)
12.3 Speech
13. Memory Usage In Conversion Processes
14. DSP Instructions
15. Instruction Usage In DSP Processes
16. Conclusion
Claims

DETAILED DESCRIPTION OF PREFERRED EMBODIMENT

1. Introduction

Figure 1:
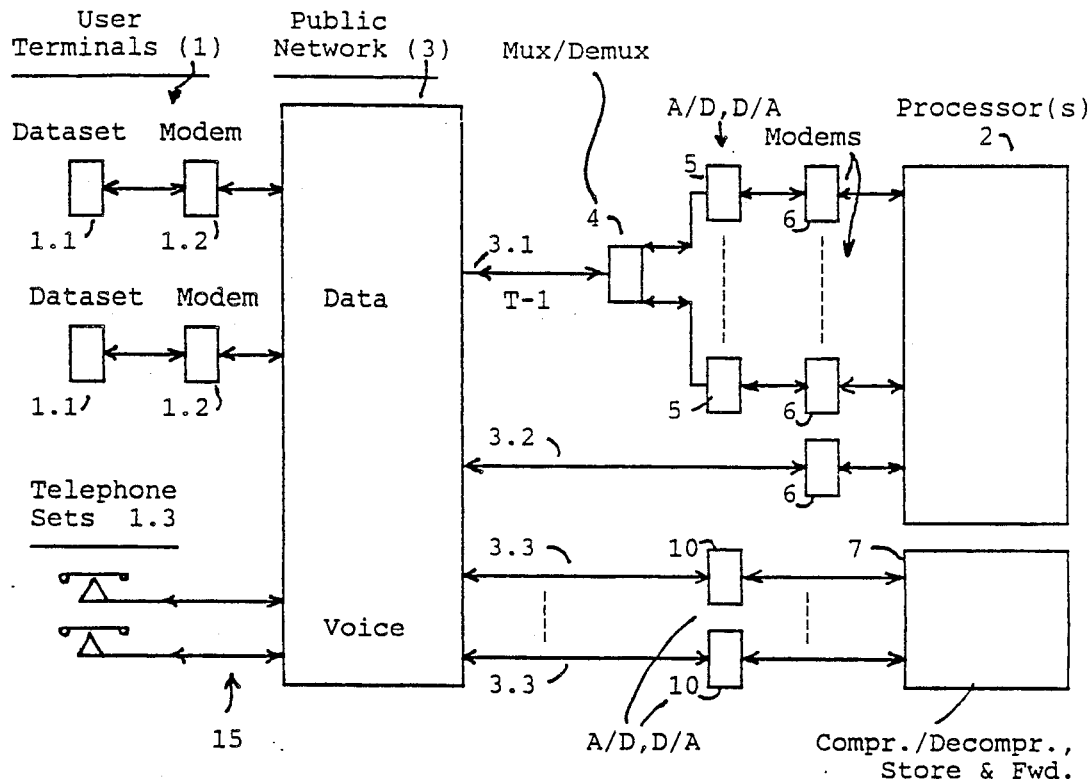
FIG. 1 illustrates prior art arrangements for transmitting information between processing centers and remote diversely equipped users.

Referring to FIG. 1, prior art telecommunication arrangements for transferring digital information between user data terminals 1 and a remote information processing center 2 through a T-1 sub-system 3.1 of a common carrier telephone system 3, usually require dedicated per line equipment 4-6 for the maximum number of user channels to be served. Circuits 4-6—each comprising multiplexing-demultiplexing circuits 4, analog-digital conversion circuits 5, and modem circuits 6—operate to transfer digital signals between input-output channels of processing center 2 and time division channels of T-1 carrier system 3.1. User signals received from switched public network 3 are demultiplexed in circuits 4, converted from transmitted digital form to analog form by circuits 5, and then reconverted to processable digital form by modem circuits 6 (the difference between transmitted digital form and processable digital form will be explained later). In the reverse direction, signals received from host 2 are converted from processed digital form to analog form in circuits 6, then converted from analog form to transmittable digital form in circuits 5, and finally multiplexed for T-1 transmission in circuits 4.

Signals in transmittable form are signals which can be handled transparently through network 3 in either analog or digital form. Data signals of the type which can be received and transmitted by Bell System 212A Data-Set Equipment—i.e. sinusoidal or other type analog signals modulated by digital data or discrete PCM digital samples of such sinusoids—represent examples of signals in this form. Signals in processable digital form are signals more directly representing data (i.e. the digital data originally used to modulate the sinusoids; e.g. data representing discrete alphanumeric characters).

Thus, in the illustrated configuration, up to 24 dedicated circuit paths 4-6 could be needed, since a T-1 system can sustain up to 24 time division channels of communication.

Also shown in FIG. 1 are individual analog circuit paths 3.2 between the network 3 and center 2, as well as discrete voice signal paths 3.3 and dedicated analog-digital conversion circuits 10 between the public network and separate facilities 7 for storage of voice messages in compressed digital form relative to user telephone sets 1.3.

Figure 2:
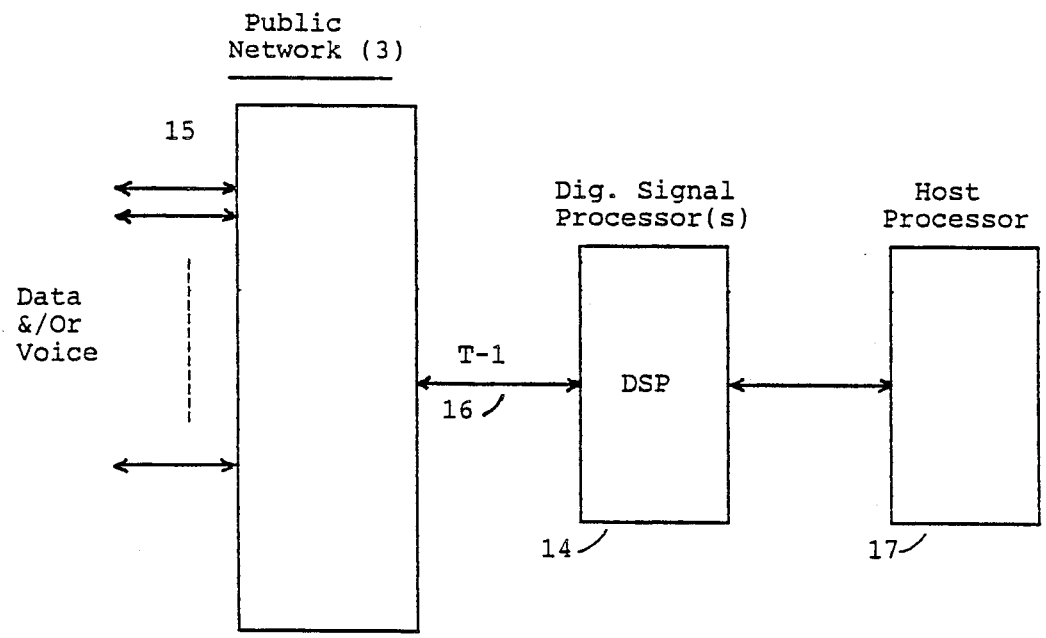
FIG. 2 illustrates schematically an arrangement in accordance with the present invention for transmitting information between a processing center and remote diversely equipped users via a high speed digital carrier (T-1) and the public switched network, without dedicating lines or circuits at the center to accommodate user diversity.

As shown in FIG. 2, the more efficient present arrangement uses a single digital signal processing system 14 (hereafter termed DSP) between a processing center 17 and T-1 trunk 16 to effectively serve the aggregate of all user lines, represented at 15 in both FIGS. 1 and 2. Although trunk 16 is designated and described as T-1, it will be understood as this description develops that this invention would serve other digital carrier systems including those used by common carriers outside the United States. Thus, DSP 14 and host 17 together can provide the equivalent of services performed by the aggregate of equipment 2, 4-7, and 10 in FIG. 1, as well as the communication functions of dedicated lines 3.2 and 3.3 in FIG. 1, for less cost, etc. The provision of DSP 14 for this purpose, as well as details of its organization and method of operation, constitute the present invention, and are more fully described hereafter.

2. DSP Organization—General

Figure 3:
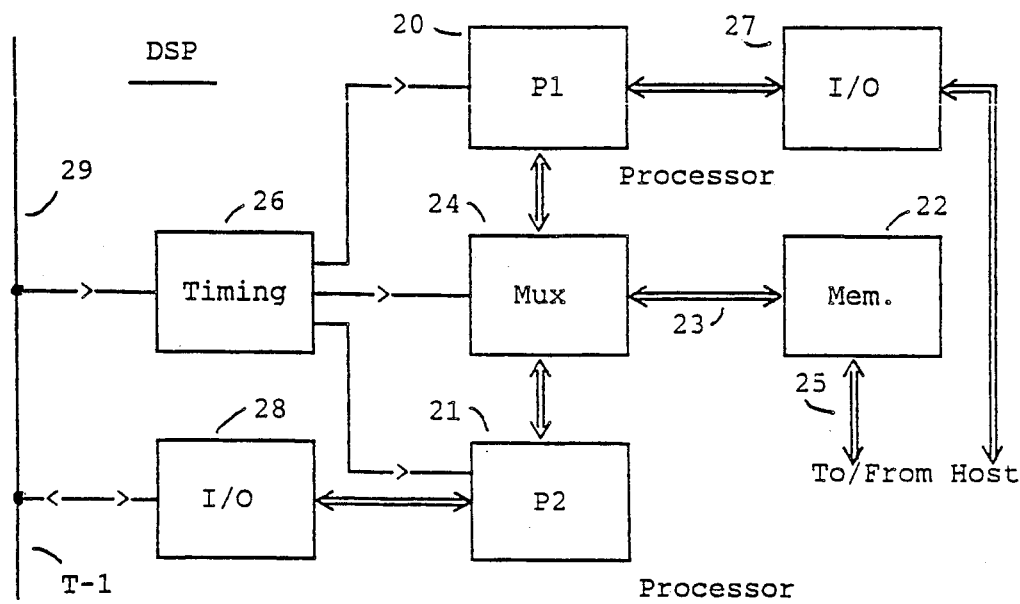
FIG. 3 schematically illustrates the general organization of presently contemplated DSP systems.

FIGS. 3-6 illustrate the general organization of the subject DSP system. As shown in FIG. 3, this system comprises two processing elements 20 and 21 (also designated processors P1 and P2), coupled to memory 22 through a bus 23 and multiplexing circuits 24. Memory 22 is also accessible directly to the host system via bus 25. Processors 20 and 21 and multiplexing circuits 24 are controlled by timing circuits 26 to have the processors access the memory in a time interleaved manner when the host processor is not accessing memory. This is more fully described in the co-pending application by Davis et al cited above under "cross-references to related applications" and incorporated herein. When the host processor is accessing memory, the DSP processors are inhibited from accessing memory, but they are free to perform other operations (e.g. data manipulations). The manner by which the processors 20 and 21 and the host system coordinate their accesses to memory with frame timing of the T-1 network is more fully discussed hereafter.

Processors 20 and 21 have input-output adapters 27, 28 for linking them to the host system and T-1 trunks. In the preferred embodiment only one DSP processor and its adapter interface to the host system (P1 and adapter 27 in FIG. 3) and only the other DSP processor and its adapter (DSP2 and adapter 28) interface to T-1 trunks. When the host is not accessing the memory, P1 and P2 have time interleaved cyclic access to the memory. This is coordinated in real time with signal activities on the T-1 lines via coupling between timing circuits 26 and these lines.

Figure 4:
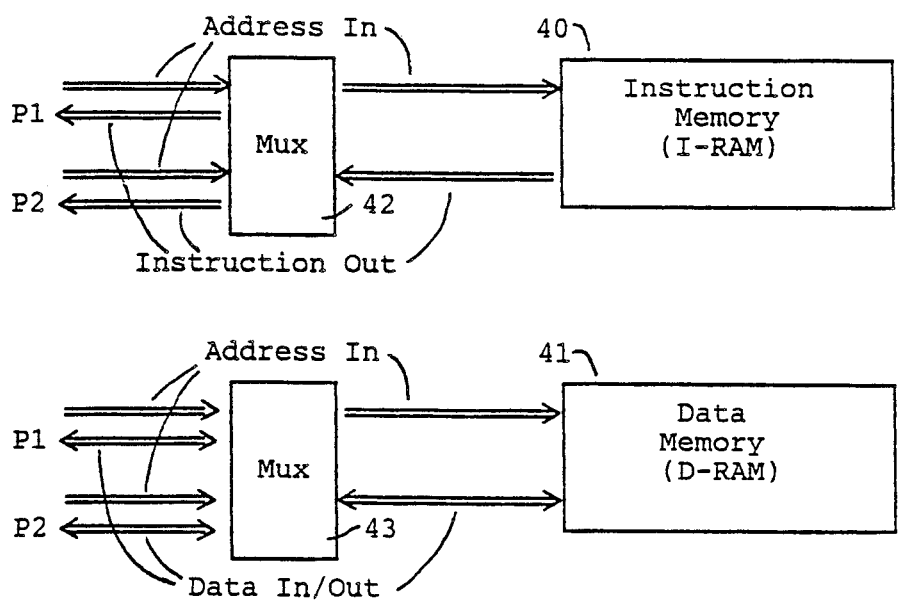
FIG. 4 illustrates a detail of the memory organization of the DSP system of FIG. 3.
Figures 5, 8:
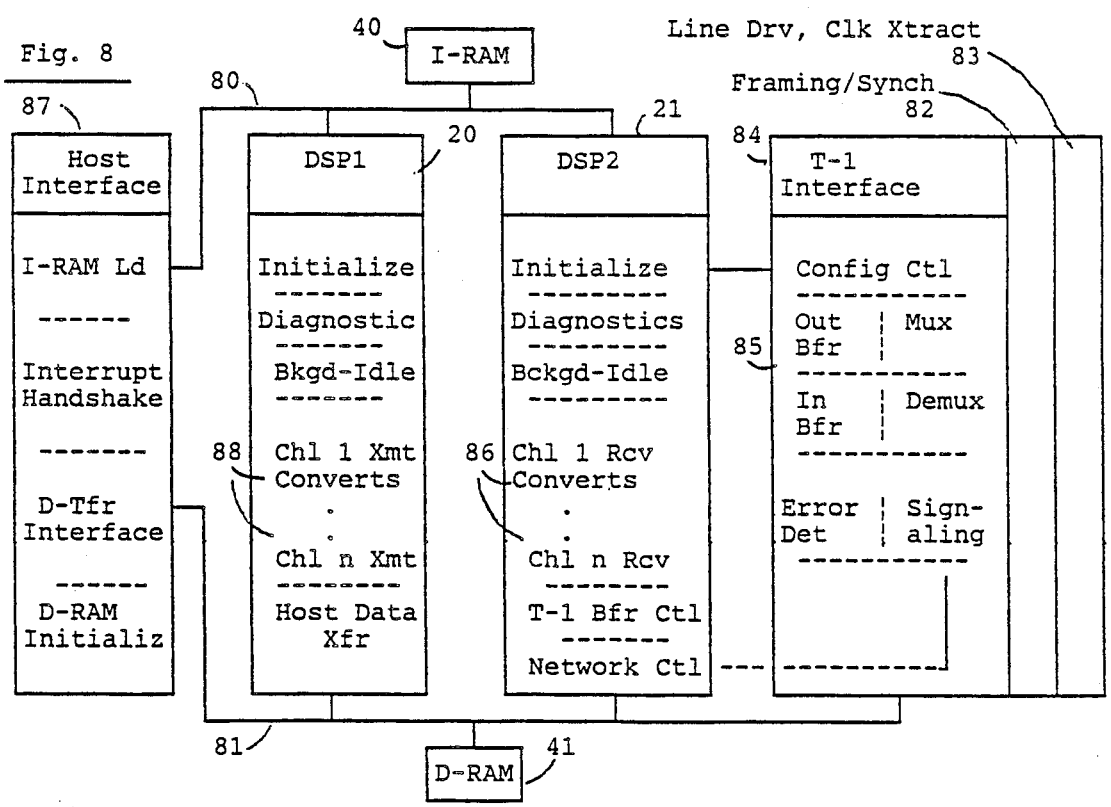
FIG. 5 illustrates timing of memory accesses by the two processing sections of the DSP system.
FIG. 8 schematically indicates functional division of responsibilities within the subject system.

As shown in FIG. 4, memory 22 is organized into two separately accessible access sections 40 and 41; 40 (I-RAM) holding instructions and 41 (D-RAM) holding data to be operated upon in accordance with instructions. As shown in FIG. 5, accesses of P1 and P2 to sections 40 and 41, and associated operations of these processors on instructions and data, are staggered in time. Thus, as one processor retrieves an instruction From I-RAM, the other one begins decoding of one retrieved earlier, and as one processor retrieves data from D-RAM the other operates on data previously fetched, etc.

Each processor 20, 21, has the pipelined organization suggested in FIG. 6; with cascaded stages 50, 51 and 52 respectively controlling fetching, decoding and execution of instructions stored in memory section 40. Sequencer 53 controls the sequence of instructions fetched by stage 50 in accordance with operations required in the respective processor relative to either its external interface (to T-1 or host) or the other processor. Such operations, discussed more fully later, generally involve: (1) separation of control information carried in specific T-1 sub-channels from other information being carried to and from users; (2) movement of such other information between T-1 channels and revolving buffer portions of data memory 41 as discussed later; and (3) processing of such other information in the revolving buffers to convert between PCM sample forms required by the T-1 system and "direct representational" forms suitable for host system usage. Register 54 buffers instructions in transit between stages 50 and 51, and register 55 buffers decoded control signals applied to stage 52. Stage 52 has address bus connection 56, for transferring addresses to data memory 41, and data bus connections 57 for exchanging data with memory 41.

3. T-1 Timing

Aspects of T-1 system timing relevant to understanding DSP operations to be described are suggested in FIG. 7. Series of 24 consecutive time channels, separated by delimiter bit signals Y, form frames, and series of 12 consecutive frames form superframes, in a manner commonly understood in the telecommunications industry (reference: "High Capacity Digital Service— Channel Interface Specification", American Telephone And Telegraph company Publication 62411, Published September 1983). Similar timing considerations apply to CEPT digital link standards mentioned earlier (reference: "CCITT Recommendations for TDM Carriers: G703, G704. G733 and G734, published in "CCITT Redbooks", 1985).

Each channel has 8 bit slots. The 5th frame of a superframe 60 is shown as typical at 61, and the 12th channel of that frame is suggested as typical at 62. As shown in the last two rows at 60, delimiter bit Y varies in distinctive S and T bit patterns from frame to frame. Such patterns are used for synchronizing to the carrier for reception and transmission. The 8th bit in each channel (bit "X") is variable in context; being interpreted in other than the 6th and 12th frames of each superframe as the least significant of 8 data bits in the respective channels, and in the 6th and 12th frames as "A" and "B" signalling bits defining call connection control functions (e.g. "on hook", "off hook", etc.)

Since the T-1 data rate is 1.544 megabits per second, the nominal period of a frame channel is 5.18 microseconds. As will be seen later, this is orders of magnitude longer than the processing period of the DSP system. Hence, many system operations can be performed during each T-1 channel period.

4. DSP Operations—General

FIG. 8 indicates the division of responsibilities between DSP1, DSP2 and their respective host and network interfaces. As suggested at 80 and 81, the host interface initializes I-RAM and D-RAM, after which the DSP processors conduct internal diagnostics and idle waiting for a host signal to begin operating relative to the network. Cooperating with DSP2, dedicated circuits 82, 83 at the T-1 interface extract bit clock and frame timing information from incoming signals. Processing this information, dedicated circuits 84 determine the network configuration (for instance toggling T-1 usage between 24 channel time division multiplex and one single large information transmission channel), and allocate buffer space suggested at 85 for reception and transmission.

With initialization completed, and the network configured, DSP2 initiates operations to establish frame/superframe synchronization, and thereafter proceeds to receive and process signals incoming from the network. The processing of such signals includes converting them from their received form, as digital representations of sampled analog waveforms, to direct digital representations of information to be processed (e.g. alphanumeric characters). These functions are suggested at 86.

Concurrently, DSP1 responds to interruptions presented by dedicated host interface circuits 87 to initiate conversion processing of outbound information signals, as suggested at 88.

5. DSP Organization—Details

FIG. 9 shows the logical organization of the subject system. Processing elements 20 and 21, and timing network 26, are shown with the same numbers as in FIG. 3, and memory elements 40 and 41 are shown with the same numbers as in FIG. 4. I-RAM 40 is addressable by the host system, for initial program loading (IPL) of instruction programs used by the DSP system, through address bus 90 and address buffer 92, under direction of control signals presented by the host on line 94. When so addressed, instruction data is written to I-RAM from the host system via data buffer 96, under direction of control signals on line 94.

Similarly, D-RAM 41 is addressable by the host through address buffer register 98, under direction of control signals furnished by the host on line 100. When so addressed, D-RAM 41 receives initial data parameters associated with loaded instruction programs via buffer register 102. Control line 100 is applied via Or circuit 104 to memory control port 106, to prepare the memory for write-in and read-out of data as required. Or 104 receives other read/write control inputs from DSP1 and DSP2 during their accesses. During initialization, control signals on lines 94 and 100 pass through OR circuit 108 to preempt control of I and D RAM's for the host.

After initialization, these memories are addressed by processors 20 and 21 in a time-interleaved mode described in the previously cited co-pending patent application of Davis et al. In such operations, multiplexor unit 109 alternately receives instruction addresses from processor #1 on bus 110 and from processor #2 on bus 112, and supplies them to instruction memory unit 40. While this is occurring, multiplexor 114 receives addresses for D-RAM alternately from the same processors, via buses 116 and 118, and transfers them to memory 41. Concurrently, OR circuit 104 referred to previously applies read/write control signals to control port 106 setting the direction of data movement relative to memory.

Accordingly, memories 40 and 41 exchange information between addressed locations and the addressing processors via paths indicated in FIG. 9. Instructions are transferred from I-RAM 40 to DSP1 via memory output bus 119 and latching register 120, and to DSP2 via bus 119 and latching register 121.

In response to readout operations, data passes from memory 41 to DSP2 via memory output bus 124, latching register 126, buffer register 128, and processor data bus 130; and from memory 41 to DSP1 via memory bus 124, latching register 136, buffer register 138, and processor data bus 140. In writing operations, data is transferred from processors 20 and 21 to memory 41 via respective processor buses 140 and 130, multiplexor unit 142, buffer register 144 and memory bus 124. This unit alternates services to the processors in the same sequence as address multiplexor 114 but appropriately staggered in time so that the data to be written arrives at the memory input port just as the appropriate address path is established.

Processor 21 links to the T-1 interface via its I/O units 146, and its address and data buses, and processor 20 links to the host system via its I/O units 148 and its address and data buses. Although shown as single lines, it should be understood that the foregoing processor and memory address and data buses are actually plural line parallel busing configurations. Preferred bus sizes are 27 bits for instruction data, 18 bits for working data, 14 bits for instruction addressing, and 15 bits for addressing working data and I/O units.

6. DSP Timing

Figure 10:
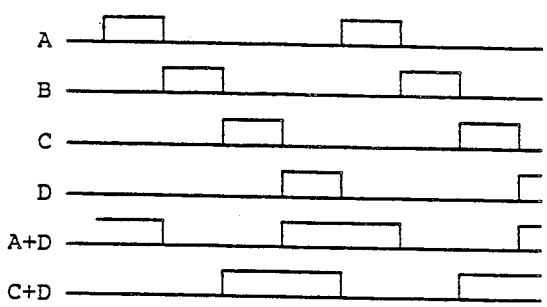
FIG. 10 illustrates timing signals designated generally in FIG. 9.

Referring to FIGS. 9 and 10, timing circuits 26 provide time staggered cyclic timing signals A, B, C, and D, and signals A+D and C+D derived by ORing A and D, and C and D. B and D are applied as references to processors 20 and 21 with relatively reversed connections so that their application in processor 20 is 180 degrees out of phase with their application in processor 21. Signal C+D controls multiplexor 109, to pass address signals to I-RAM 40 from processor 20 during C and D times, and from processor 21 during A and B times; processor 20 originating its signals during B times and processor 21 originating its signals during D times.

Signals D and B are also respectively applied to instruction latching registers 120 and 121 which respectively supply instructions to processors 20 and 21. Thus instructions addressed by processor 20 initially during B times appear at respective latching register 120 during successive D times, and instructions addressed by processor 21 during D times appear at respective latches 121 during successive B times. Similar time staggered time relationships are established between the processor and memory 41. Address multiplexor 114 is operated by signals C+D to initiate data accesses for processor 21 during A and B times and processor 20 during C and D times. Data read out during such operations for processor 20 is latched at D times in latching register 136, and for processor 21 at B times in latching register 126. Write data multiplexor 142 operates at A+D times to write data from processor 21 at B and C times and from processor 20 at A and D times.

6.1 DSP vs T-1 Timing

Figure 11:
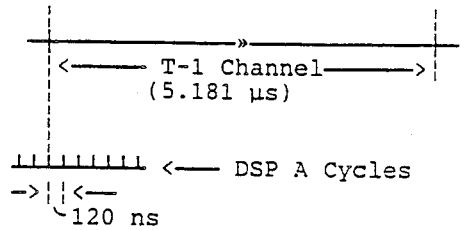
FIG. 11 illustrates how DSP operations are timed relative to T-1 channel periods.

FIG. 11 contrasts lengths of DSP cycles, as defined by parameters A-D, to recurrence periods of T-1 channels. DSP cycles recur at intervals of 120 nanoseconds, while T-1 channels recur at intervals of 5.181 microseconds. Thus, many DSP operations can be performed during each T-1 channel period. Since data paths between DSP processors and their I/O adapter units are at least 8 bits wide, it can be appreciated that only a single cycle on the respective DSP data bus is required for either processor to transfer data to and/or from a T-1 channel. It can be appreciated further that the time required for each such bus transfer is so small by comparison to the length of a T-1 channel as to present minimal interference to other processor operations (control signal extraction, data format conversions, etc.).

7. I-RAM/D-RAM Usage

Figure 12:
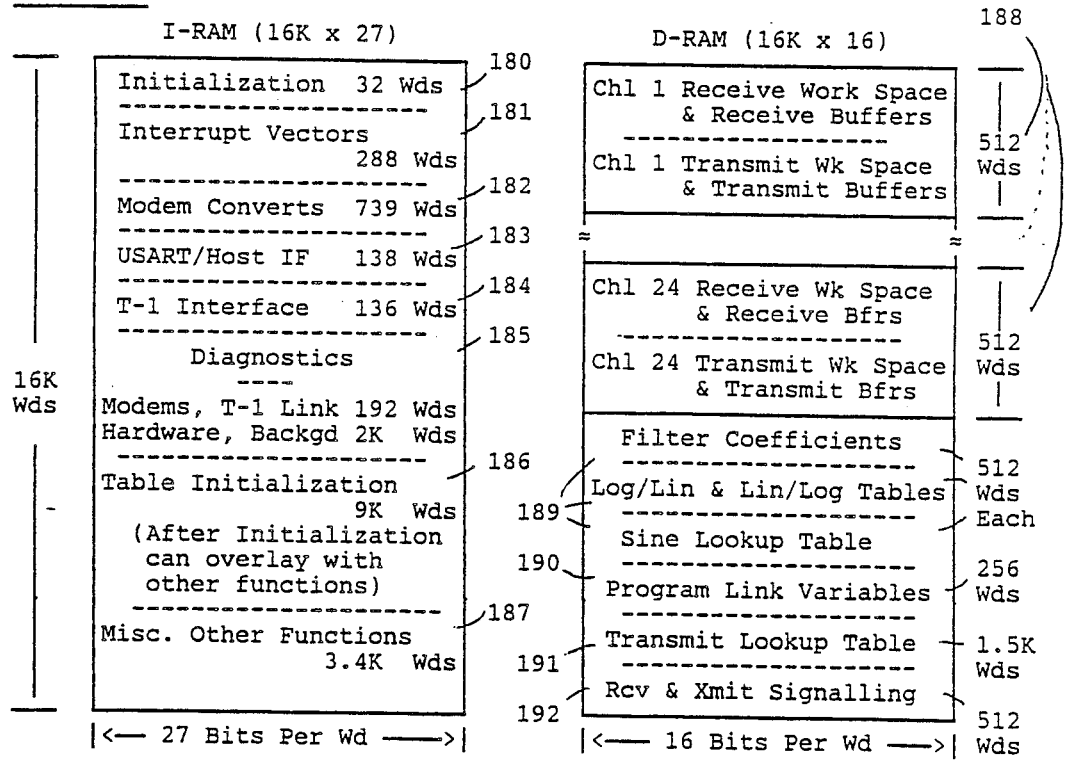
FIG. 12 illustrates capacities and contents of the instruction memory and data memory sections of the subject DSP system.

FIG. 12 indicates the size and information contents of I-RAM and D-RAM. Both have 16,000 (16K) address locations, with word sizes of 27 bits in I-RAM and 16 bits in D-RAM.

Instruction and control parameters in I-RAM include: a 32 word section 180 for initialization parameters, a 288 word section 181 for handling host system interruptions, a 739 word section 182 for data conversions tailored to remote user modems, a 138 word section 183 for USART/Host interface processes (USART, as defined in product specifications of the Intel 8251, means Universal Synchronous or Asynchronous Receiver/Transmitter) including a device for parallel to serial conversion in transmission and serial to parallel conversion in reception, as well as means for implementing other protocol functions such as byte alignment, error checking, formatting, etc., as required for standard data communication protocols (e.g. asynch, bisynch, SDLC, HDLC, etc.), a 136 word section 184 for linking to the T-1 interface, a diagnostic section 185 (including a 192 word portion for modem and T-1 process diagnostics, and a 2K word section for hardware and background diagnostics), a 9K word section 186 for initializing tables used in the foregoing processes (which after initialization can be overlayed with instructions for other functions such as speech compression), and a 3.4K section 187 for miscellaneous other functions.

D-RAM includes a 512 word section for each currently active T-1 channel—that is, up to 24 such sections, occupying a space 188 of up to 12,228 words, for sustaining one T-1 line interface (to sustain communications with more than one T-1 line the preferred practice is to use plural DSP's linked to separate I/O channels of one or more host systems). Each space 188 includes work and buffer spaces allocated for reception and transmission processing. Depending upon the functional requirements of reception and transmission processing a tradeoff may be made to allocate more of the available space to one or the other function. D-RAM further includes 3 512 word sections indicated at 189 for storing filter coefficients, tables for conversion of data between log and linear forms, and tables for sine value lookup for use in generating sinusoidal carrier signal functions. D-RAM also includes a 256 word section 190 for linking variables used by conversion programs, a 1.5K word section 191 for lookup tables needed for transmission processing, and a 512 word section 192 for staging for receive and transmit signalling bits (refer to earlier discussion of FIG. 7).

8. DSP Initialization

Figure 13:
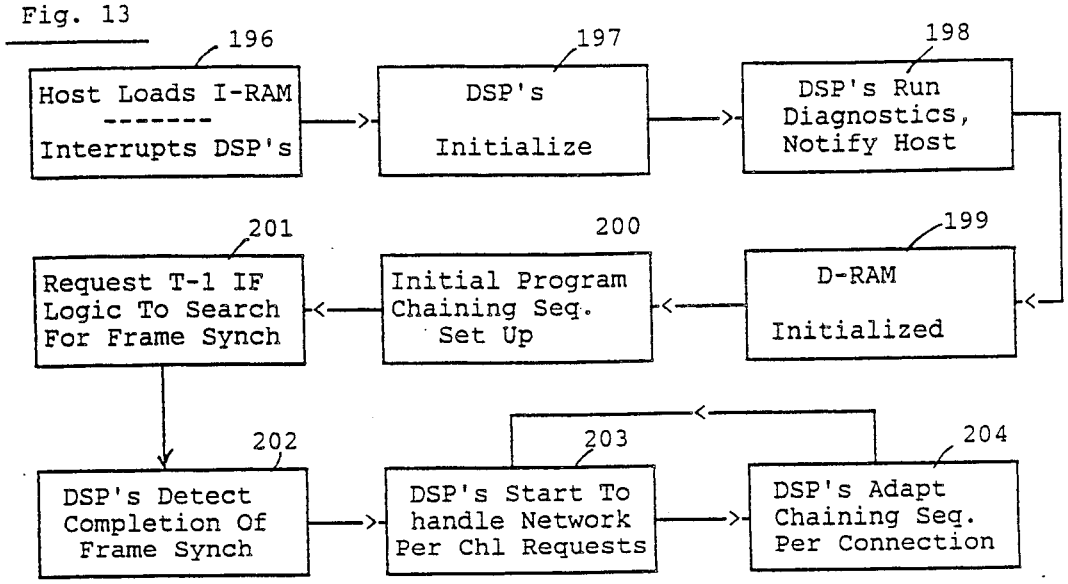
FIG. 13 illustrates how the subject system is initialized.

Referring to FIG. 13, the DSP subsystem initializes itself in a process generally indicated at steps 196–204. In step 196, the host loads microinstructions and control data for the DSP's into I-RAM, and notifies the DSP's via interruptions. DSP1 and DSP2 thereupon disable interrupts and, by alternate access to I-RAM, as explained previously, execute the bootstrap initialization sequence contained therein (step 197, and refer to space 180 FIG. 12). Notice that both DSP's may perform this and other sequences simultaneously, via their shared access to I-RAM, thereby reducing memory capacity required for each DSP's instructions).

Thereafter, the DSP's run diagnostics upon themselves (step 198) using instructions in I-RAM space 185 (FIG. 12), and at completion notify the host of their status. Any detected fault is repaired before operations proceed. After successful completion of diagnostics, D-RAM is initialized (step 199) and linking information is set into D-RAM space 190 (FIG. 12) to establish initial program chaining procedures for each DSP (step 200).

At this point a request is made to the logic interfacing between DSP2 and the T-1 system to start the search for T-1 frame synchronization (step 201 and FIG. 7). Upon detection of frame synchronization, DSP's are informed via interruptions (step 202) and start to handle network requests for connection on a per channel basis (step 203). In this process, DSP2 receives the signalling bits (A,B FIG. 7) containing the connection request information, assembles them into words (in D-RAM space 192, FIG. 12) and notifies DSP1 of such assembly. Thereupon DSP1 interrupts the host system and passes the relevant location of the signaling word to the host. The host retrieves and analyzes these words to determine the connection and passes signalling information via D-RAM to the DSP's for transfer to the network. In this way, connections (T-1 channel allocations and switched paths through the public network) are established. For each connection, a suitable program chaining sequence is established (step 204) to enable the DSP's to perform the reception and transmission conversion processes appropriate to the type of data being transmitted and the equipment at the remote user station.

9. DSP/Host Interface

Figure 14A:
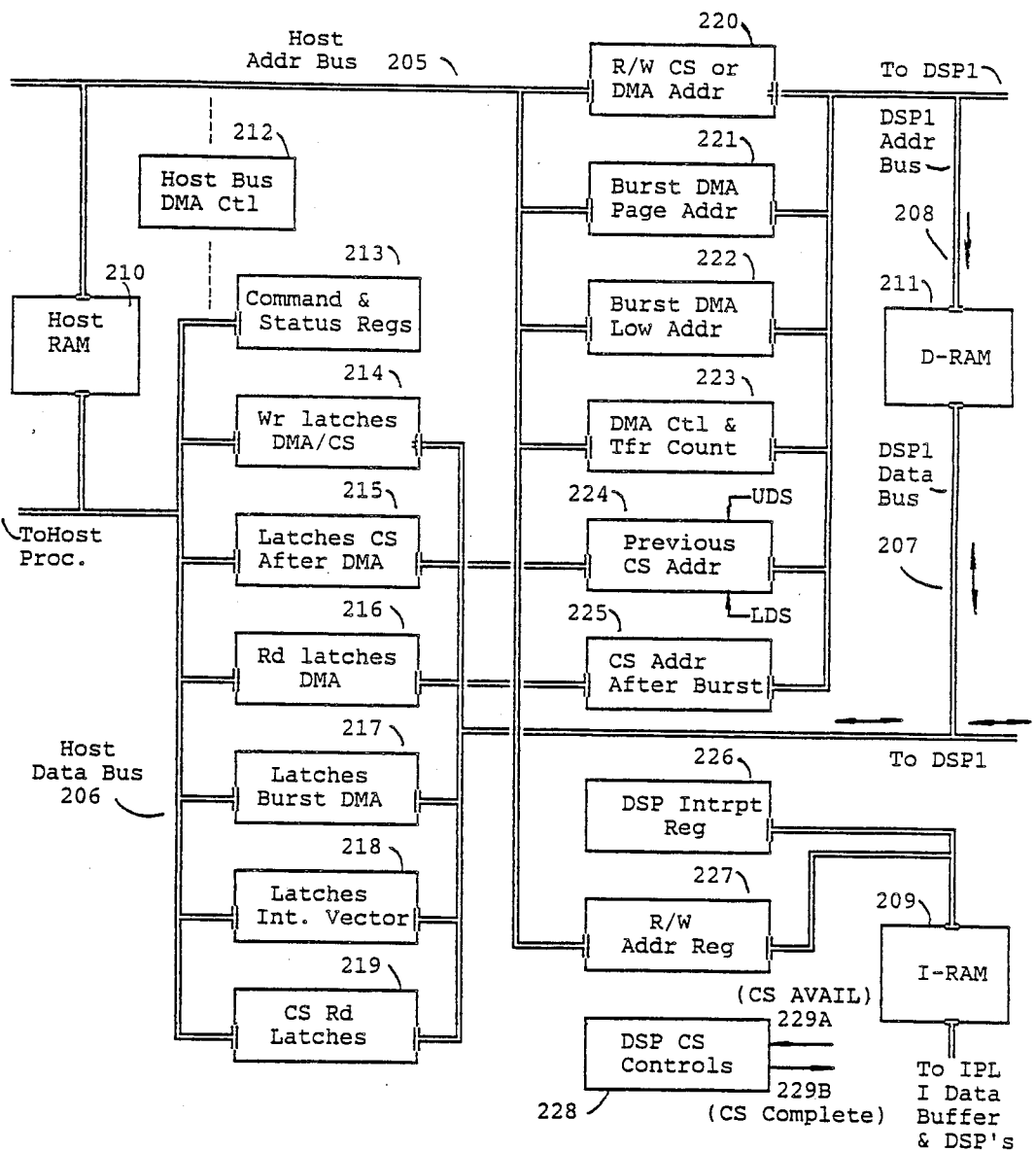
FIGS. 14A, 14B and 14C illustrate how the exchange of signals between parts of the subject system is handled.

FIG. 14A indicates the logical interface between the DSP's and Host for data transfers. The instruction transfer interface between the host and I-RAM 209 (or block 40 in FIG. 9) is a simple one-way bussing configuration using address buffer 227 and a not-shown data buffer. Most of the activity for instruction loading is accomplished during system initialization when the DSP's are idle and time is not critical. However, the data transfer interface to D-RAM is used both by the DSP's and host DMA (direct memory access) and cycle steal controls when interference with DSP activities is less tolerable.

Under host control, data is transferred between host RAM 210 and D-RAM shown at 211, via host interface latches 214 and 216; 214 for outbound data and 216 for inbound data.

During host controlled data transfers, addresses are sent from the host to D-RAM addressing port 208 via address register 220, and are applied to D-RAM in one of two modes; a cycle steal mode or a direct access mode. In the cycle steal mode, described below, data is transferred while the DSP's are not using the D-RAM, whereas in direct access mode, DSP access is preempted by the host. Obviously, the cycle steal mode is more efficient in terms of bus usage and operation in the DSP subsystem.

Cycle steal transfers operate as follows. As each DSP decodes an instruction (previously fetched from I-RAM) it determines if its next cycle of read or write access to D-RAM is not required. For example, instructions defining data movement from an internal DSP register to another DSP register do not require the DSP to read data from or write data to D-RAM, and at such times the D-RAM is made accessible for cycle steal accesses.

At such times, the affected DSP applies a "CS Avail" signal, at 229A, to cycle steal control logic 228, this signal indicating availability of D-RAM for cycle steal access. If a request from DMA controls 212 is pending, logic 228 responds to the availability indication by immediately transferring data between register 214 and the D-RAM location defined by the address in register 220.

Since data in transit from host to D-RAM must be processed in the order of its transfer, and since cycle steal write transfers do not afford time to pass information regarding the location in D-RAM which has been written (where in normal DMA transfers time is available for updating address counts on the DSP side to reflect such), a mechanism is required to automatically indicate the completion of each "write cycle steal" transfer and the address written. This mechanism is implemented here by the "write CS complete" line 229B and backup buffer register 224. When line 229B is activated, DSP1 is notified via interrupt that the previously requested transfer is complete. Meanwhile, as the completion indication is given, the D-RAM address in register 220 is passed to register 224 to which DSP1 refers. DSP1 must then store this address internally as the next address from which it is to read data. The interrupt to DSP1 is cleared when circuit 226 detects a branch to the vector address for that interrupt.

Since host-DSP data transfers may be either a word (two bytes) or one byte wide, another function required in processing data so transferred is for the DSP to be able to determine if the amount of data transferred in the cycle steal write was one word or one byte. The mechanism for this involves the structure of buffer register 224 and upper data strobe (UDS) and lower data strobe (LDS) signals sent from host DMA. Register 224 is 16 bits wide and the 14-bit address word in register 220 is transferred to the middle 14 bits in register 224. UDS and LDS are respectively transferred to the highest and lowest order bit postions in register 224. UDS and LDS are both high (1 values) when a word is transferred, and UDS is high and LDS is low when only a byte is transferred. Thus, the values of the low and high order bits in register 224 indicate the width of the completed cycle steal transfer to the DSP.

Data Transfers to/from the host may also be controlled by DSP1. Data transfers between D-RAM and host RAM are controlled by DSP1 using multiple registers, including outbound registers 215 and inbound registers 217; the inbound registers carrying data from D-RAM to Host RAM and the outbound registers carrying data in the opposite direction. Each set comprises a pair of registers in tandem with associated latching controls (not shown) so that at any instant of time a pair may hold two data words (16 bits each) in transit. The not-shown latching controls indicate the state of vacancy or fullness of the pair. Whenever an inbound transfer is in process and one of the registers of the inbound pair is full a write request is presented to Host RAM. Similarly, when an outbound transfer is in process and one of the registers of the outbound pair is empty a read request is presented to host RAM.

As described previously, cycle steal transfers are used whenever possible; to fill registers 217 during inbound transfers and empty registers 215 during outbound transfers. During data transfers controlled by DSP1, counters keep track of lengths of scheduled burst transfers (block 223) and of successive address locations in D-RAM (block 225) and Host RAM (blocks 221 and 222).

Additional DSP/Host interfacing logic includes a multiplicity of status registers 219, which can be loaded by DSP1 with application dependent status information. The host can read such status whenever necessary. Interrupt vector latch 218 is also loaded by DSP1 and provides the host with an interrupt vector during an interrupt acknowledge cycle. Interrupts so generated are used by DSP1 to inform the host that a response is required. Additional command and status registers 213 allow the host processor to monitor error conditions in the DSP attachment logic and to selectively reset or ignore them depending on conditions.

10. DSP/DSP Interface

Figure 14B:
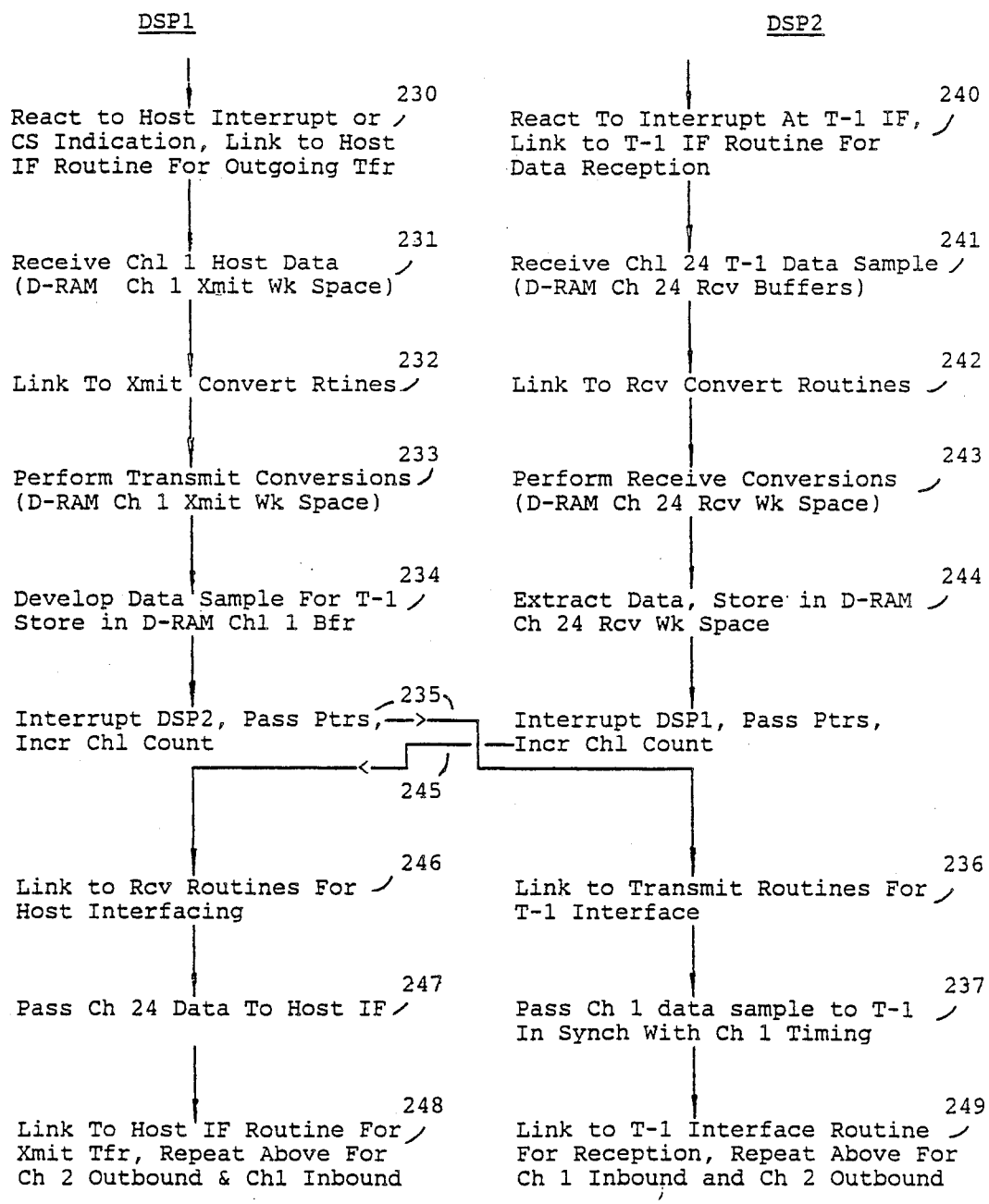

Referring to FIG. 14B, the division of data signal handling responsibilities between DSP1 and DSP2 is: DSP1 handles the exchanges at the host interface and the conversion processes relative to outbound data, while DSP2 handles all exchanges at the T-1 interface and conversions of data received from the T-1. Handling responsibilities are handed over from one to the other processor, after conversion processing, by means of interruptions.

Relative to data outbound from host interface to T-1 interface, DSP1: reacts to host interruption or indication that a cycle steal transfer has occurred (action 230) to link to an instruction routine (in I-RAM) for handling outbound data relative to a T-1 channel indicated by a channel counter (in the illustration, T-1 Channel 1).

Using the address or address pointer passed from the interface, DSP1 accesses the data just transferred (action 231), which is found in D-RAM Transmit Work Space (See FIG. 12 at 188), and links to instruction routines (action 232) for conversion of data appropriate to the type of data being handled in Channel 1 at this time, and to the type of modem equipment employed at the remote user station currently linked to channel 1. With these routines, the data in the Channel 1 work space is processed (action 233) to produce a channel 1 byte sample suitable for T-1 transmission and to store that sample into the Channel 1 Transmit Buffer space in D-RAM (action 234). DSP1 then interrupts DSP2 (Action 235.

DSP2 then takes over the handling of outbound data relative to T-1 channel 1, links to an instruction routine for transmit interfacing to T-1 (action 236), and passes the data sample formed by DSP1 over to to T-1 channel 1 (action 237).

During the foregoing actions 230-235 by DSP1, DSP2 occupies itself with receiving data in another T-1 channel (here, the channel prior to channel 1, i.e. channel 24). To do so, DSP2 reacts to an interrupt at the T-1 interface to link to a reception processing routine (action 240). Using a pointer passed in such interrupt, DSP2 accesses data samples currently in the D-RAM channel 24 receive buffers (action 241). Then linking to receive conversion routines in I-RAM appropriate to the type of data and linked user configuration associated with Channel 24(action 242), DSP2 performs conversion processing on received data samples (action 243) and stores a data byte suitable for host processing in the D-RAM channel 24 receive work space (action 244). Finally, an interruption is passed to DSP1 (action 245) alerting the latter to the D-RAM location and T-1 channel involved.

This causes DSP1 to link to instruction routines for host interfacing (action 246) and pass a channel 24 data byte to the host system (action 247). Upon concluding respective actions 247, 237 for transferring data respectively to the host and T-1 systems, DSP1 and DSP2 respectively link to routines for awaiting host and T-1 interrupts relative to the next data to be processed, and repeat the process just described for that data (respective actions 248, and 249).

It should be realized that in the foregoing discussion, a block of data (multiple bytes) may be processed from a single channel (rather than a single byte per channel), in order to minimize instruction overhead. Also, the interrupt processes (235, 245) between DSP1 and DSP2 are actually asynchronous relative to each other and provide only a loose coordination of the flow of processing between the two processors.

11. DSP/T-1 Interface

Figure 14C:
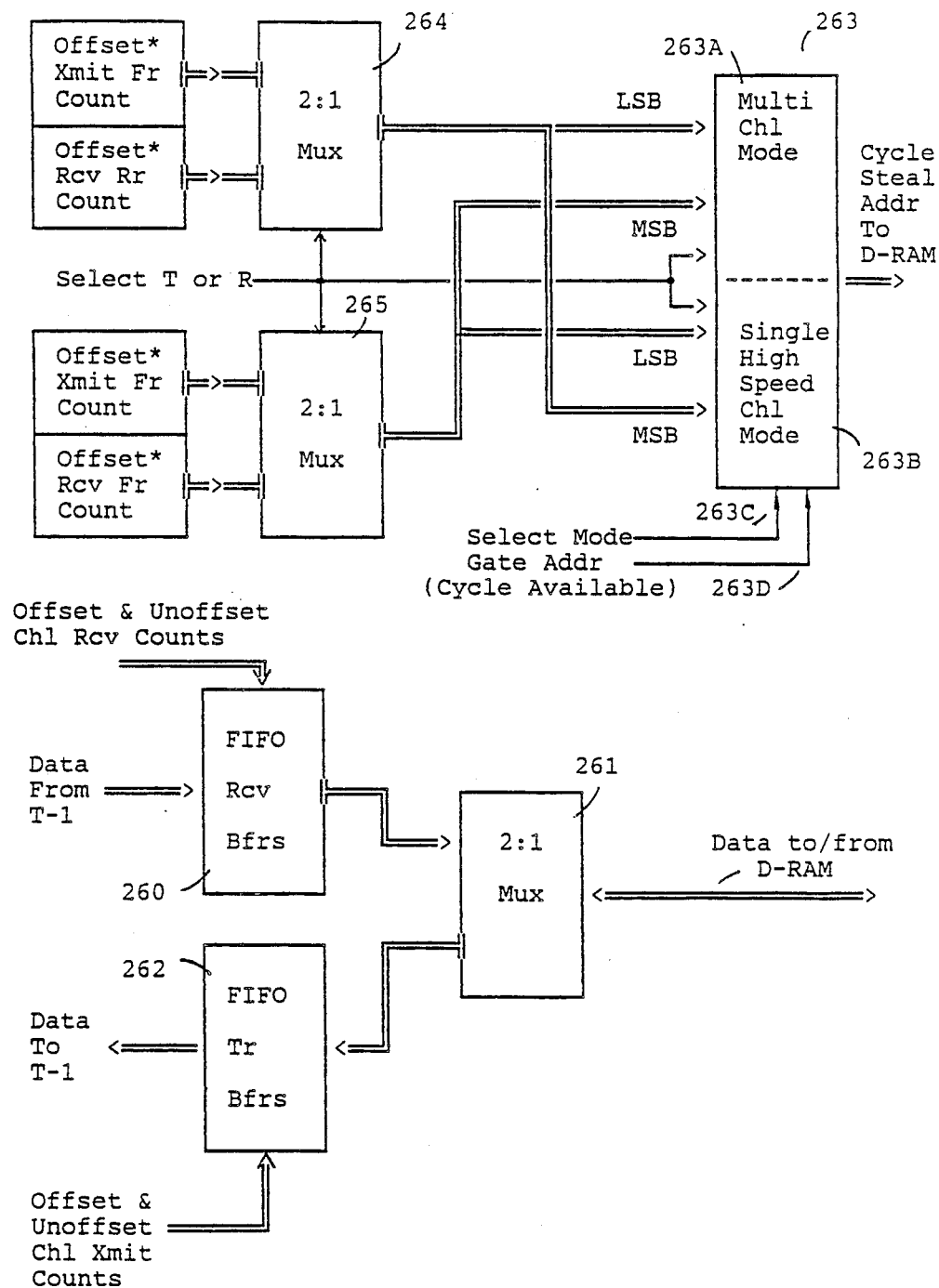

FIG. 14C illustrates relevant features of the data transfer interface between the DSP's and the T-1 network. Data received from the network is staged in FIFO (first in first out) buffers 260, transferred out from these buffers in the order of reception to bus interface circuit 261, and from the latter circuit to D-RAM. Data outbound to the network is passed from D-RAM through circuits 261 to FIFO buffers 262, and from said buffers to the network in the order of entry into the buffers. Accesses to D-RAM for these transfers are by cycle steal action, similar to that described above relative to element 228 in FIG. 14A, in order to minimize interference with current DSP operations.

Circuits shown at 263-265 for addressing D-RAM relative to the foregoing data transfer operations are of particular interest. Mode select/switch circuit 263 has two multiplex sections 263A and 263 B for sustaining these operations in two different modes associated with two different modes of usage of the T-1 frame bandwidth; a "multi-channel" mode in which the frame is time divided into channels allocatable to multiple users (see FIG. 7), and a "single channel" mode in which the frame is allocated to a single high speed bit stream to or from a single user. Addresses to circuits 263A/263B are "offset" frame and channel counts explained next, which are passed through switching circuits alternating between "offset" transmit and receive channel and frame count functions corresponding to the timing of transmission and reception channels and frames on the T-1 link.

In the context just used, the "offset" counts are adjusted in value relative to the channel and/or frame currently being received so as to compensate for delays encountered by corresponding data in the respective FIFO buffer paths 260 and 262. The objective is that the offset receive (transmit) channel and frame counts should correspond in instantaneous value to the numbers of channel and frame time slots on the T-1 from which the data byte next out of buffer 260 was received (or respectively to which the next data byte into buffer 262 is to be sent). Thus, if the time needed for a received data byte to pass through buffer 260 is equal in duration to 5 T-1 channel periods, the offset channel count for that byte would be N-5, where N is the number of the T-1 time slot currently being received and N-5 represents the number of the time slot in which the byte was actually received. Similarly, for a data byte to be sent out in channel M the offset count associated with its entry into buffer 262 would be N+j where N is the number of the slot currently being transmitted, and j is the number of data bytes currently in buffer 262 waiting to be sent out. Thus, in cycle steal transfers to/from D-RAM, the unoffset count is used at the T-1 network interface to write to receive buffer 260 and read from transmit buffer 262, while the offset count is used at the other interface to read from receive buffer 260 and write to transmit buffer 262.

Addresses passed to D-RAM by circuits 263 are selected functions of the foregoing offset counts, the selection depending on the mode of T-1 usage. In multichannel mode, the offset frame count is applied to the LSB (Least Significant Bit) address bit positions at the input to multiplexer circuit 263A, and the offset channel count is applied to the MSB (Most Significant bit) address bit positions of that circuit. Each address term applied to 263A in this mode, when concatenated with an additional offset value not shown, is used to address byte locations within a circular buffer formed in D-RAM work space locations 188 (see FIG. 12). Since channel counts form the most significant address bits in this mode, data received/sent in consecutive channels is written to/read from locations in D-RAM locations offset from each other by 512 word location positions. Since frame counts form least significant bits in this mode, data bytes received/sent in the same channel in successive frames are written to/read from consecutive byte locations in D-RAM. Thus, the data in each channel is staged in consecutive locations within a 512 word space allocated to that channel, and can be manipulated directly within that space for required modem conversions and digital filter transformations to be described.

In single channel high speed mode, addresses are formed through circuit 263B, where channel counts form the least significant bits and frame counts the most significant. Thus, in this mode, bytes received/sent in consecutive channel slots of a T-1 frame, and representing a single user bit stream, are written/read to/from consecutive byte locations in D-RAM space 188.

Mode select signals at 263C select between multichannel and high speed single channel modes. "Cycle Available" signals at 263D, indicating availability of D-RAM for cycle steal access, gate addresses through the selected mode section of circuits 263; namely section 263A or 263B. Thus, data is passed between the T-1 link and D-RAM in cycle steal mode, presenting minimal interference with processing operations concurrently being performed by the DSP's. Not shown priority logic in the network interface compares offset counts for transmit and receive functions to determine which function will use the next cycle available for data transfer.

12. DSP Data Conversions

FIGS. 15-18 illustrate conversion processes applied to different types of data ranging from simple alphanumeric data to data representing images (non-coded data) and speech. These processes are described next.

12.1 Voice Band Data Modems

Referring to FIG. 15, typical functions for duplicating operations of a coherent phase shift keyed modem in all-digital manner include operations 270 on received (T-1) signals and operations 271 on signals to be transmitted. The order of these operations is indicated at 272.

Operations 270 include operations 273 for converting received T-1 data signals from log to linear form; the log form representing quantized and compressed samples of an analog waveform transmitted by the (remote) T-1 trunk operator, and the linear form representing directly processable samples of the same analog waveform. Results of conversion operations 273 receive AGC (automatic gain control) processing at 274, followed by digital filtering at 275 of real (275A) and imaginary (275B) parts of the signal functions.

If required, equalization is applied at 276 (equalization is used to compensate for spectral distortions introduced in the voice grade lines of the public system, and is generally needed only for signals transmitted at high baud rates on the order of 2400 bits per second). A preferred equalization arrangement for the fixed sampling rate environment of this invention (where it is impractical to attempt to synchronize symbol sampling in reception to the transmission baud rates of multiple senders) is disclosed in the previously referenced co-pending application by Davis et al now U.S. Pat. No. 4,899,366, "Tap Rotation In Fractionally Spaced Equalizers ...".

Filtered signals then receive carrier recovery processing at 277, followed by demodulation processing at 278. Signals produced by process 278 are subjected to slicer/decoder processing 279 (serving to locate centers of symbol periods where maximum signal levels are available for processing, and to decode detected phase shifts into bits representing transmitted data), followed by descrambler processing 280 (serving to reverse a scrambling process applied in the transmission) and protocol processing 281 (serving to synchronize processing to 8-bit byte boundaries and to provide error checking). Results of protocol processing, representing data signals in a form directly suited for data processing applications, are forwarded to the host system.

Transmit process 271 comprises reverse protocol processing 290, followed by scrambler processing 291 (serving to enhance timing recovery at the receiver by ensuring that data transitions occur randomly even if data patterns repeat), followed by encoder processing 292 (serving to convert groups of bits into corresponding phase shifts to be transmitted), followed by modulation processing 293, where a digitally synthesized form of carrier oscillations introduced at 294 is combined with the output of the encoder process. Output of the modulator process is subjected to digital filtering 295, of real and imaginary parts shown respectively at 295A and 295B, followed by level control processing 296, followed by lin to log form conversion processing 297 yielding data signals suitable for T-1 transmission and handling through remote analog portions of the public network.

The initial microcode load to I-RAM typically will include code segments and subroutines to handle multiple modem types. Since all such segments reside in I-RAM simultaneously, it is simply a matter of linking them in the right order within the main line of program flow in order to control the assignment of appropriate segments to each channel. To accomplish this, the data segment for each channel is allocated several locations which are used for linking: one pointing to the program segment in I-RAM to be used in processing the next channel's data, and the other pointing to the data segment to be used in that process. In this way, a chain can be constructed which can be modified as required to allocate appropriate segments to each active channel. Obviously, the same program segment can appear multiple times in the chain (as needed to perform the same process) and inactive channels can be bypassed in the chain.

A and B signalling bits within the T-1 frame (FIG. 7), denoting on-hook and off-hook conditions, are used by a supervisory background program to modify the chain when new channels become active; i.e. as incoming calls cause new links to be added, pointers are inserted in the chain for positioning such links in the correct process sequence (188, FIG. 12), while as calls are terminated respective pointers are removed.

In the simplest case, all channels would use the same conversion process (same segments with re-entrant pointers). For multiple different processes, per channel allocation of processes may be handled in several ways. A fixed allocation may be made wherein channels 1-M use process A, channels M-N use process B, etc. In an ISDN (Integrated Services Digital Network) environment, the common signalling channel is all digital and could carry messages to set up conversion processes relative to analog channels. A third and more flexible alternative would be to determine the type of conversion process required based on a signal received during an initial training period. Many modems offer multiple speed options, and usually include in their startup procedures steps to determine the transmission speed at the other end of the line. Some modems also switch from one type of modulation to another (e.g. phase shift or PSK to frequency shift or FSK).

At the host interface, a structure of control blocks may be arranged to control the subject DSP attachments. A configuration control block would be used to initialize the attachment and select various frame format options. A channel control block would be used to activate a specific channel, and determine its use and associated conversion process. If outward dialing is required this control block may contain the number or numbers to be dialed, which would be converted in the DSP to the appropriate form of dial impulses for transmission to the network.

A separate channel service control block would would be used for each active channel. When a channel is activated, receive and transmit control blocks would be used to reserve host RAM space for data buffers. A separate chain of such control blocks can be set up for each active channel to ensure that adequate buffer space is always available. if the host has prior knowledge of the required conversion process, based on configuration for a specific application, the channel services control block can be used to set up that process for a channel being activated. Otherwise, a process may be set up to detect the type of signal being received, and based on that information provide linkage to a suitable process.

The foregoing operations per se are not new as digital data processing functions, and are not presently claimed as such. What is new of course is the application of such processes within the context of the present invention, wherein digitized samples of analog signals are being passed between a host system and a public carrier network multiplex interface for linkage to variously equipped end users, and wherein the modem conversions required between the host and carrier interfaces are carried out in an all-digital fashion (eliminating need for dedicated circuits for analog to digital conversion, etc.). Individually, such operations are described extensively in Textbooks and Published Technical Literature. Representative textbooks include:

1. "Digital And Analog Communication Systems", K. S. Shanmugam, Published by John Wiley & Sons in 1979.
2. "Digital Signal Processing", A. V. Oppenheim and R. W. Schafer, Published by Prentice-Hall in 1975.

Particular functions are described in:

1. AGC: In "Adaptive digital Automatic Gain Control", by G. T. Davis, in The IBM Technical Disclosure Bulletin, vol. 27, No. 10B, March 1985, Page 6334.
2. Carrier Recovery: In "Carrier-Phase Tracking In Synchronous Data-Transmission Systems", H. P. Kaeser, IBM Research Report RZ812, published 1/25/77.
3. Modulator/Demodulator: "Microprocessor Implementation of High-Speed Data Modems", P. J. VanGerwen et al, IEEE Transactions On Communications, Vol. , 2/77, pages 238–250.
4. Transmit and receive filters: "Optimum FIR Transmitter and Receiver Filters For Data Transmission Over Band-Limited Channels", P. R. Chevillat and G. Ungerboeck, IEEE Transactions On Communications, Vol. , August 1982, Pages 1909–1915.

12.2 Non-coded (Image) Data

Figure 16:
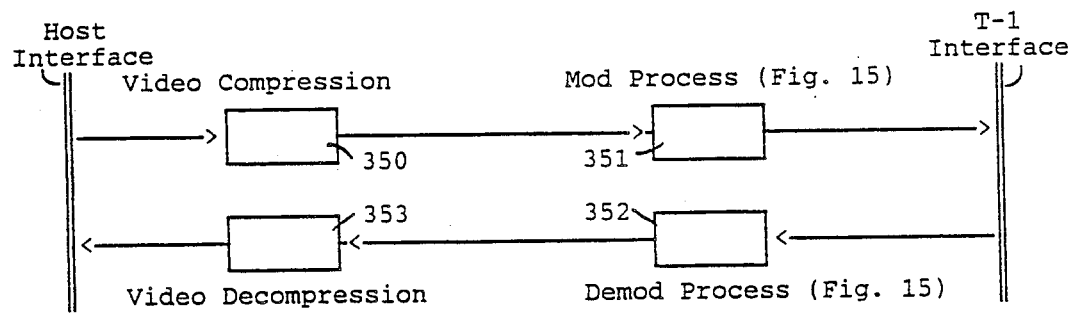
FIG. 16 illustrates how the subject system would handle non-coded picture information between carrier and host processor systems.

FIG. 16 illustrates how non-coded (image or facsimile) data signals are handled in the subject system.

Image/video data provided by the host system for transmission to the network is optionally compressed at 350, and subjected to modulation processing at 351, as in FIG. 15. Compression as an option depends on the equipment available at remote user stations. The purpose of compression is to reduce the bandwidth otherwise required to sustain such transmission. A reference for suitable compression algorithms is indicated in the drawing.

In the reverse direction, video data received from the network is demodulated at 352 (see FIG. 15 for this type of handling) and if in compressed form the demodulated signals are subjected to decompression processing at 353. Again it is noted that transmission in compressed form is a user option.

Video compression/decompression is described in: "Key Papers In The Development Of Coding Theory", 1974, Edited by E. R. Berlekamp (book of selected reprints from IEEE Press Series)

12.3 Speech

Figure 17:
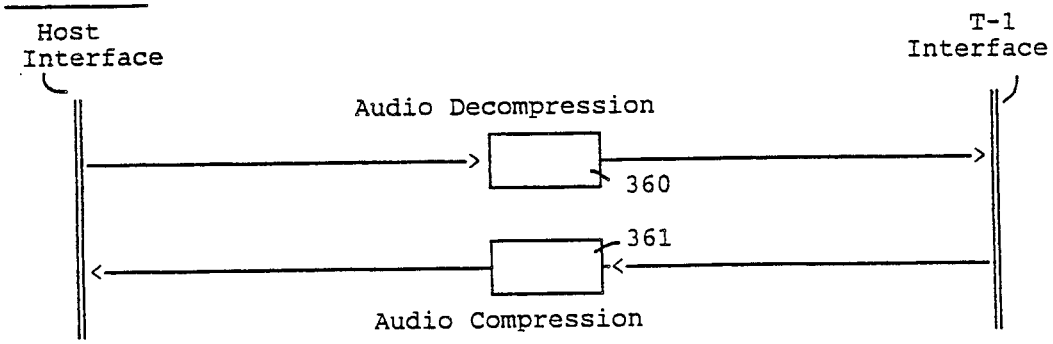
FIG. 17 illustrates how the subject system would handle speech signals between carrier and host systems.

Handling of audio/speech signals between network and host is indicated in FIG. 17. A typical host application would be message store and forward (fee based telephone answering services, requiring rerouting of calls to a user/subscriber for storage of caller messages at the host (or in host peripherals), and forwarding of such messages to the user at the latter's request. In such applications host storage would be in compressed form and network transmission would be decompressed, as suggested respectively at 360 and 361.

Compression and decompression algorithms for audio signals are described in: "Speech Coding", J. L. Flanagan et al, IEEE Trans. On Commun. Vol Com-27 No. 4, Pages 710–737, April 1977.

13. Memory Usage In Conversion Processes

Figure 18:
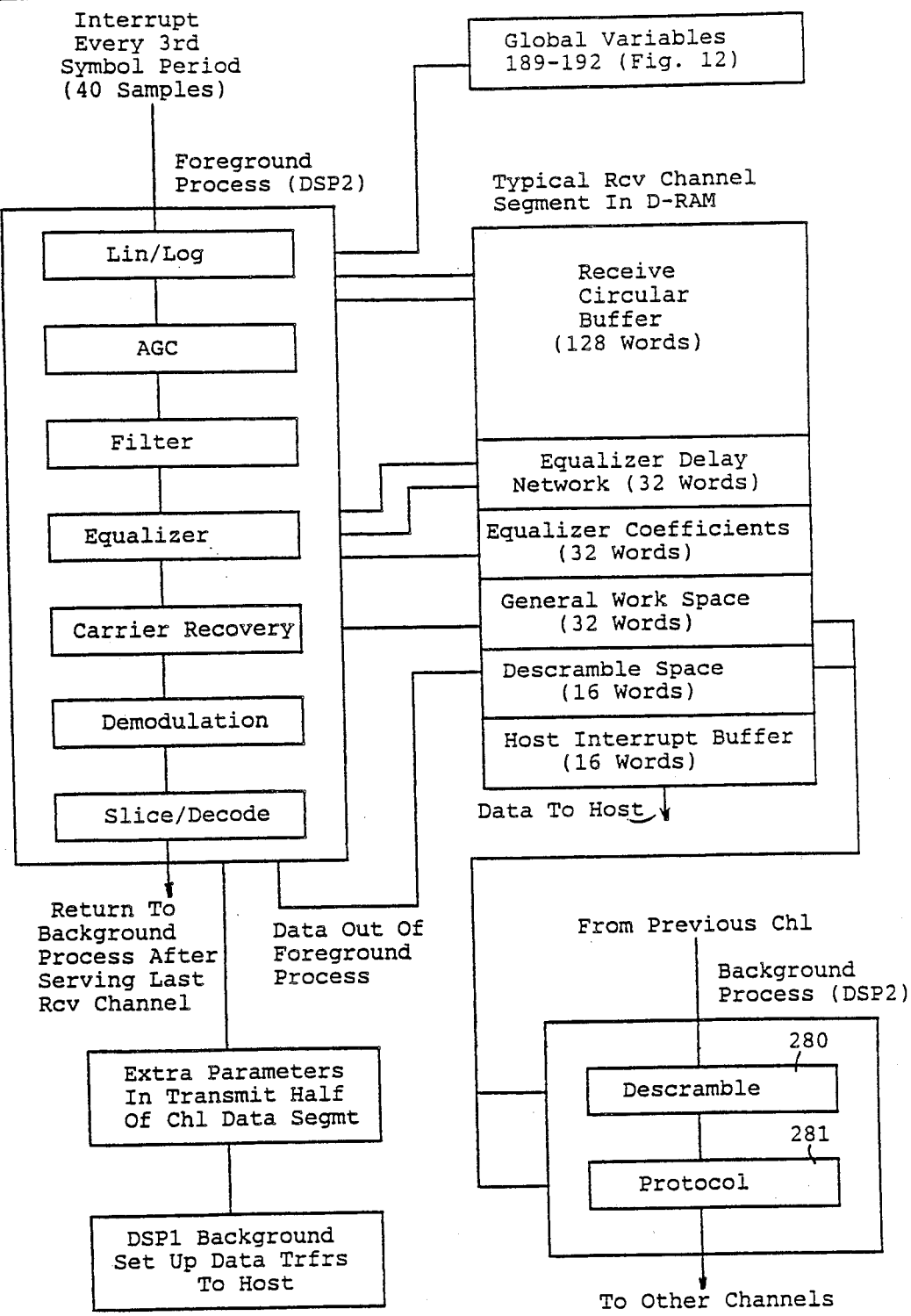
FIG. 18 illustrates a detail of the logical organization of the data memory portion of the subject system showing how each T-1 channel is allocated a revolving FIFO buffer space of selected capacity tailored to the type of information currently being handled through the respective channel.

Use of D-RAM in foregoing time division digital modem applications/operations is illustrated in FIG. 18. The figure illustrates the handling of receive conversion operations (see FIGS. 12 and 15). Handling of transmit conversion operations involve similar memory usage in transmit buffer and work space sections of D-RAM.

As indicated in this Figure, relative to representative receive channel n of T-1, spaces 380 and 381 in D-RAM are respectively allocated as Receive Buffer and Receive Work spaces. Data received in channel n is loaded into the Receive Buffer space as shown at 382, under control of channel counts associated with channel n and frame counts. Data in successive frames is loaded into consecutive byte locations in this space beginning at an initial location defined by a not-shown capacity counter and continuing until the space is filled. When that occurs, the capacity count recycles to point to the initial location and the process repeats with new received data being written over previously received data currently stored in the buffer space.

As the buffer space fills, DSP2 is directed by the application sustaining channel n handling to digital filtering processes 384 in I-RAM, and begins to generate the filtered output as described previously.

As demodulated data is extracted from space 381A copies of same are written into space 381B reserved for digital filtering, as suggested at 384. Relative to the latter space, the channel n application invokes routines 385 for digital filter processing. Space 381B is effectively treated as a separate recirculating delay line through which data is passed repeatedly to extract filtered data.

As filtered data is extracted from contents of space 381B, it is moved into other parts of the work space for other handling (see FIG. 15), until final data is formed. Final data is staged in yet another part of the work space of channel n for transfer to the host system in the order of extraction.

14. DSP Instructions

The following lists DSP instructions by type. Type abbreviations used are "RR" (for register to register), "RI" (for register immediate), "RX" (for register index), "RS" (for register to storage).

| Register to Register (RR) Instructions | | |
|---|---|---|
| AHR | r1,r2 | Add H/W Register |
| AHRP | r1,r2 | Add H/W Register Positive |
| AHRV | r1,r2 | Add H/W Register with Saturation |
| CHR | r1,r2 | Compare H/W Register |
| LHR | r1,r2 | Load H/W Register |
| LHRC | r1,r2 | Load H/W Register, 1's Complement |
| LHRN | r1,r2 | Load H/W Register, 2's Complement |
| LHRP | r1,r2 | Load H/W Register Positive |
| LOG | r1 | Log |
| LOGM | r1 | Log Magnitude |
| MAX | r1,r2 | Maximum |
| MAXM | r1,r2 | Maximum Magnitude |
| MHR | r1,r2 | Multiply H/W Register |
| MHRU | r1,r2 | Multiply H/W Register Unsigned |
| MIN | r1,r2 | Minimum |
| MINM | r1,r2 | Minimum Magnitude |
| NHR | r1,r2 | AND H/W Register |
| NOP | | No Operation |
| OHR | r1,r2 | OR H/W Register |
| PNOP | | Protected No Operation |
| SIGM | r1 | Signum |
| SHR | r1,r2 | Subtract H/W Register |
| SHRV | r1,r2 | Subtract H/W Register with Saturation |
| TAHR | r1,r2 | Test Add H/W Register |
| TAHRP | r1,r2 | Test Add H/W Register Positive |
| TAHRV | r1,r2 | Test Add H/W Register with Saturation |
| THR | r1 | Test H/W Register |
| TNHR | r1,r2 | Test AND H/W Register |
| TOHR | r1,r2 | Test OR H/W Register |
| TSHR | r1,r2 | Test Subtract H/W Register |
| TSHRV | r1,r2 | Test Subtract H/W Register with Saturation |
| TXHRC | r1,r2 | Text XOR H/W Register, 1's Complement |
| XHRC | r1,r2 | XOR H/W Register, 1's Complement Result |
| ZAHR | r1,r2 | Zero and Add H/W Register |
| ZHR | r1 | Zero H/W Register |
| ZSHR | r1,r2 | Zero and Subtract H/W Register |
| Register Immediate (RI) Instructions | | |
| LHA | r1,d(idx) | Load H/W Address |
| LHI | r1,imm | Load H/W Register with Immediate Value |
| Register Index (RX) Instructions | | |
| B | d(idx) | Branch Unconditionally |
| BAL | d(idx) | Branch and Link |
| BALI | O(CDB) | Branch and Link Indirect |
| BBS | mask,d(idx) | Branch Bit Select |
| BC | mask,d(idx) | Branch On Condition |
| BCI | mask,O(CDB) | Branch On Condition W/Inhibit |
| BFOR | d,(idx) | Branch Unconditional Foreground |
| BFORI | O(CDB) | Branch Unconditional Foreground W/Inhibit |
| BIPAR | d(idx) | Branch Indirect Program Address Read |
| BIPAW | d(idx) | Branch Indirect Program Address Write |
| BLEX | d(idx) | Branch Unconditionally, Level Exit |
| IC | r1,d(idx) | Insert Character |
| ICM | r1,mask,d(idx) | Insert Character Under Mask |
| LC | r1,d(idx) | Load Character |
| LCM | r1,mask,d(idx) | Load Character Under Mask |
| LH | r1,d(idx) | Load H/W From Storage |
| STH | r1,d(idx) | Store H/W To Storage |
| Register Index Extended (RX) Instructions | | |
| BE | d(idx) | Branch Equal |
| BH | d(idx) | Branch High |
| BL | d(idx) | Branch Low |
| BM | d(idx) | Branch Mixed |
| BN | d(idx) | Branch Negative |
| BNE | d(idx) | Branch Not Equal |
| BNH | d(idx) | Branch Not High |
| BNL | d(idx) | Branch Not Low |
| BNN | d(idx) | Branch Not Negative |
| BNO | d(idx) | Branch Not Ones |
| BNP | d(idx) | Branch Not Positive |
| BNZ | d(idx) | Branch Not Zero |
| BO | d(idx) | Branch Ones |
| BP | d(idx) | Branch Positive |
| BV | d(idx) | Branch Overflow |
| BY | d(idx) | Branch On Carry |
| BZ | d(idx) | Branch Zero |
| BEI | O(CDB) | Branch Equal W/Inhibit |
| BHI | O(CDB) | Branch High W/Inhibit |
| BLI | O(CDB) | Branch Low W/Inhibit |
| BMI | O(CDB) | Branch Mixed W/Inhibit |
| BNI | O(CDB) | Branch Negative W/Inhibit |
| BNEI | O(CDB) | Branch Not Equal W/Inhibit |
| BNHI | O(CDB) | Branch Not High W/Inhibit |
| BNLI | O(CDB) | Branch Not Low W/Inhibit |
| BNNI | O(CDB) | Branch Not Negative W/Inhibit |
| BNOI | O(CDB) | Branch Not Ones W/Inhibit |
| BNPI | O(CDB) | Branch Not Positive W/Inhibit |
| BNZI | O(CDB) | Branch Not Zero W/Inhibit |
| BOI | O(CDB) | Branch Ones W/Inhibit |
| BPI | O(CDB) | Branch Positive W/Inhibit |

| | | |
|---|---|---|
| BVI | O(CDB) | Branch Overflow W/Inhibit |
| BYI | O(CDB) | Branch On Carry W/Inhibit |
| BZI | O(CDB) | Branch Zero W/Inhibit | called. The current newest sample is assumed to have been already loaded into the first position of the pipeline when the routine is called, and the filter output is left in R2.

| FLTRIN | CSECT | |
| --- | --- | --- |
| | CARRY UNLOCK | |
| PI | LH<R1,OOO(RO)>,ZHR<R6> | *LD HOO |
| PI | LH<R5,062(R4)>,ZHR<R2> | *LD DOO |
| PI | LH<R3,002(RO)>,NOP<O><MHR<R1,RXH> *LD HO1; HOO*DOO | |
| PI | LH<R5,O6O(R4)>,NOP<O><MHR<R1,RXH> *LD DO1; HOO&DOO | |
| PI | LH<R1,OO4(RO)>,MHR<R3,RXH> *LD HO2; HO1*DO1 | |
| PI | LH<R5,058(R4)>,AHR<R2,RMH>,MHR<R3,RXH> *L DO2;HO1*DO1 | |
| PI | LH<R3>,006(RO)>,MHR<R1,RXH> *LD HO3; *HO2*DO2 | |
| PI | LH<R5,056(R4)>,AHR<R2,RMH>,MHR<R1, RXH> *L DO3;HO2*DO2 | |
| | . | |
| PI | LH<R1,O6O(RO)>,MHR<R3,RXH> *LD H30; H29*D29 | |
| PI | LH<R5,OO2(R4)>,AHR<R2,RMH>,MHR<R3, RXH> *L D30;H29*D29 | |
| PI | LH<R3,062(RO)>,MHR<R1,RXH> *LD H31; H3O&D3O | |
| PI | LH<R5,OOO(R4)>,AHR<R2,RMH>,MHR<R1, RXH> *L D31;H3O*D3O | |
| PI | NOP<O>,MHR<R3,RXH> * H31*D31 | |
| PI | AHR<R2,RMH>,MHR<R3,RXH> * H31*D31 | |
| PI | NOP<O><MHR<R3,RXH> *ACC LOW; * NOP | |
| BFOR | OO(ILR) *RETURN TO MAIN | |
| AHR | R2,RMH *ACC HIGH | |
| END | FLTRIN | |

| Compound Pipeline Instructions (PI) | |
|---|---|
| PI | ce<r1,r2>,MHR<r3,r4> |
| PI | LBI<r1,imm[(idx)]>c3<r2,r3> |
| PI | LBI<r1,imm[(idx)]>,ce<r2,r3>, MHR<r4,r5> |
| PI | LH<r1,d(idx)>,ce<r2,r3> |
| PI | LH<r1,d(idx)>,ce<r2,r3>,MHR<r4,r5> |
| PI | STH<r1,d(idx)>,ce<r2,r3> |
| PI | STH<r1,d(idx)>,ce<r2,r3>,MHR<r4,r5> |
| Define Constants (DC) | |
| DC | A(address) |
| DC | C'string' |
| DC | F'value' |
| DC | H'value' |
| DC | V'(address) |
| DC | X'value' |
| Define Storage (DS) | |
| DS | A |
| DS | C |
| DS | F |
| DS | H |

15. Instruction Usage In DSP Processes

An example follows of how the foregoing instructions are used to implement a portion of a routine for modem conversion.

This is an example of a segment which implements a 32 tap fir filter. Coefficients are in RAM at 0000 to 0063 (byte addresses relative to index register R0).

The data samples are stored in a RAM area from 0000 to 0063 (byte addresses relative to index register R4). These data samples are shifted through the filter pipeline by circular indexing using R4. Both index registers, R0 & R4, are initialized, and R4 is circularly incremented by a higher level routine before "FLTRIN" is

Instruction Summary

A. Program Flow Control
  Branch
  Conditional Branch
  Subroutine Call
  Subroutine Return
B. Memory Reference
  Memory (or I/O port) read
  Memory (or I/O port) write
  Load Immediate From Instruction Memory
C. ALU
  Arithmetic (Add, Subtract, Complement)
  Logical (And, or, XOR, SNOR)
  Other Special Instructions (Saturation, Test, Clear)
  Register to Register Move
D. Multiply
E. Parallel Combinations of B, C, & D above (Capable of 1 FIR Filter Tap Per Instruction)

Typical example of usage in computing a "sum of products" equation for an FIR filter required by modern algorithms: Sum (Data$^m$ × COEF$^n$)

| Memory Ref | Multiply | ALU |
|---|---|---|
| Load Data1 | | Clear RA |
| Load Coef2 | 1 × 2 | Clear RB |
| Load Data3 | 2 × 3 | Add Mult Output to RA |
| Load Coef4 | 3 × 4 | Add Mult Output to RB |
| Load Coef5 | 4 × 5 | Add Mult Output to RA |
| Load Coef6 | 5 × 6 | Add Mult Output to RB |
| Load CoefN | (N+1)×N | Add Mult Output to RA |
| (Filter output-Time T) | . | Add Mult Output to RB |
| Store RA | | |
| (Filter output Time T+1) | | |

| Memory Ref | Multiply | ALU |
|---|---|---|
| Store RB | | |

16. Conclusion

We have shown and described a system for interfacing between time division digital carriers and data processing centers and for providing high speed conversion and digital filtering functions to adapt between equipment restrictions at remote user interfaces and processing requirements at the centers. What is considered new in respect hereto is characterized in the following claims.

We claim:

1. A system for providing information telecommunication services between an information handling center and multiple diversely equipped user terminals remotely linked to said center through parts of the public switched telephone network, said center being required to be able to process information contained in signals transferred to said center via said network and system, said system comprising:

at least one time division multiplexed high speed digital carrier trunk having a plurality of time channels assignable for carrying signals between said center and said remote user terminals via said network, and providing access for said center to said public telephone network; said trunk carrying digitized log PCM signal functions representing diverse types of information and having various different signal formats in accordance with diverse characteristics of equipment at said user terminals; said log PCM signal functions being incompatible in form with information signal processing requirements of said center, and therefore the information content of said signal functions is not directly processable by said center while said signal functions are in said log PCM forms; and all-digital signal processing means coupling said center with said trunk for exchanging signals with time channels on said trunk in diverse signal forms compatible with requirements of equipment at said remote user terminals, for exchanging signals with said center in forms directly compatible with information processing requirements of said center but incompatible with signalling requirements of said remote user terminals, and for converting signals in transit between said center and said trunk channel into forms respectively compatible with said signalling requirements of said user terminals and said information processing requirements of said center.

2. A system for providing information telecommunication services between an information handling center and multiple diversely equipped user terminals remotely linked to said center through the public switched telephone network comprising:

at least one time division multiplexed digital carrier trunk having a plurality of time channels and providing access via said time channels for transferring digitized log PCM signals between said system and said remote user terminals via said public telephone network in diverse digital forms compatible with corresponding diverse signalling requirements and characteristics of equipment at said remote user terminals; said log PCM signals being incompatible in form with information signal processing requirements of said center; and all-digital signal processing means coupling said center with said trunk, and operating in response to programmable instructions for exchanging signals with said center in forms directly compatible with information signal processing requirements of said center, for exchanging signals with said trunk time channels in forms directly compatible with signal requirements and characteristics of said remote user terminals, and for converting said signals in transit between said center and said trunk time channels into forms respectively compatible with requirements of said center and said remote user terminals; said signal processing means comprising:

first digital signal processing means interfacing with said center, and second digital signal processing means interfacing with said trunk time channels;

first and second random access memory arrays, one memory array allocated for storing data and the other memory array reserved for holding the instructions executable by signal processing means;

means cyclically coupling said first and second signal processing means with said memory arrays in time-staggered fashion whereby said first and second processing means alternate in performing operations relative to said data as directed by said instructions;

interruption control means coupling said first and second processing means for enabling said first and second processing means to exchange interrupt requests, and for enabling said first processing means and center to exchange interrupt requests; and means responsive to interruption requests presented by said interruption control means for enabling said first and second processing means to exchange data through said data storing memory array, whereby said first processing means may be operated to process data prepared by said center for one of said user terminals and said second processing means may be operated to further process said data so that each said processing means may operate thereby to partially convert the signal form of said data to to prepare the data for transmission to the user terminal via a time channel on said digital trunk.

3. A system in accordance with claim 1 wherein said signal processing means includes means to perform conversions on signals received from said trunk time channels in order to compensate for distortions introduced into such received signals during transmission of corresponding signals through the public switched network, whereby such received signals after conversion are presented to said center in a form uniformly free of distortions.

4. A system in accordance with claim 2 including means cooperative with said memory arrays for configuring selected portions of said arrays into plural circular buffers dimensioned in accordance with the requirements of plurality of signal conversion processes being handled in said signal processing means.

5. A system in accordance with claim 2 including means adapting said signal processing means for performing digital filtering and modem conversion transformations on digital signals en route between said center and said remote user terminals via said trunk, said conversion transformations being tailored to the types of modems contained at individual said user terminals, and means coupled to said memory arrays for configuring portions of said data storing array as a plurality of circular buffers such that each buffer is allocatable to an interface to a time channel of said trunk and can be used concurrently to sustain both modem transformations and digital filtering transformations relative to communication data held therein.

6. A system for providing information telecommunication services between an information handling center and multiple diversely equipped user terminals remotely linked to said center through the public switched telephone network comprising:

at least one time division multiplexed digital carrier trunk having a plurality of time channels and providing access via said time channels for transferring digitized log PCM signals between said system and said remote user terminals via said public telephone network in diverse digital forms compatible with corresponding diverse signalling requirements and characteristics of equipment at said remote user terminals; said log PCM signals being incompatible in form with information signal processing requirements of said center; and all-digital signal processing means coupling said center with said trunk, and operating in response to programmable instructions for exchanging signals with said center in forms directly compatible with information signal processing requirements of said center, for exchanging signals with said trunk time channels in forms directly compatible with signal requirements and characteristics of said remote user terminals, and for converting said signals in transit between said center and said trunk time channels into forms respectively compatible with requirements of said center and said remote user terminals; said signal processing means comprising:

means for selectively handling signals representing digitized speech or sound data; said means including means for performing compression and decompression conversions on said signals whereby said signals can be stored in a compressed form at said center, in order to conserve usage of storage facilities at said center, and transmitted over said trunk in decompressed form.

7. A system in accordance with claim 1 wherein said signal processing means includes means for selectively handling conversions of signals representing digitized video image data; said means for selectively handling including means for performing decompression and compression conversions on said signals representing said data whereby said data is handled in decompressed form at said center, in order to provide said center with the full image content of the represented data, and in compressed form over said trunk in order to conserve use of communication bandwidth in the transmission of said signals over said trunk.

8. A communication system for transmitting data between an information handling center and multiple diversely equipped user terminals remotely linked to said center through parts of the public switched telephone network comprising;

a host data processing system at said center;

at least on time division multiplexed digital carrier trunk having a plurality of channels and providing access for said center with said public telephone network; said trunk carrying digitized signals in Log PCM form representing quantized samples of analog signals with diverse characteristics relating to the characteristics of equipment at said user terminals; and all-digital signal processing means at said center for transferring data and control signal between said host system and time channels on said trunk, and for performing modem conversions on said data signals in transit between said host system and trunk time channels; said conversions serving to adapt said center to diversity of equipment at remote user terminals by presenting data signals for transmittal over said trunk in forms directly receivable at said user terminals and by presenting data signals to be processed by said host data processing system in a form directly suited to processing applications at said system;

said signal processing means comprising first and second digital signal processors, random access instruction storing memory coupled to both said digital signal processors for holding instructions to be used by both and coupled to said host system for receiving instruction program loads for said digital signal processors from said host system, a random access data storing memory coupled to both digital signal processors for holding data to be accessed by either or both digital signal processors and coupled to both said host system and said trunk for exchanging data with said host system and said trunk; said instruction and data memories having recurrent cycles of accessibility in which alternate cycles are normally allocated to said first and second digital signal processors in an interleaved manner; so that each digital signal processor can retrieve instructions from instruction memory without interrupting or slowing operations in the other digital signal processor and so that each digital signal processor can fetch data for data memory and write date to data memory without interrupting or slowing operations in the other digital signal processor; and cycle steal control means coupled to said digital signal processors, data memory, said host system and said trunk for determining when a cycle of access to said data memory is not required by either digital signal processor, and for selectively allocating said cycle to either said host system or the trunk, whereby data can be exchanged between said host system and data memory between data memory and trunk in a cycle steal mode having the effect of not interrupting or slowing operations in either digital signal processor.

9. A communication system in accordance with claim, 8 wherein said instruction memory is configured to store programs of instructions for concurrent execution by both said digital signal processors, whereby for instance both digital signal processors may be operated to access a common block of diagnostic instructions in a time interleaved manner, and perform self-diagnostic test defined by said block.

10. A communication system in accordance with claim 8 wherein said data memory is configured to provide a workspace for each said trunk time channel of a size sufficient to sustain modem conversions relative to all channels concurrently.

11. A communication system in accordance with claim 8 including:

Direct memory access control means coupling said host center with said data memory for providing said host with access to said data memory in contention with said digital signal processors; said direct memory access control means and cycle steal control means cooperating whereby when said host system requires access to said data memory is preferably provided in a cycle steal mode so as to not interfere with operations of said digital signal processors, but when such access is unavailable the direct memory access control means takes over and provides access while blocking said digital signal processors from having access.

12. A communication system in accordance with claim 8 including means for adapting said signal processing means for performing diverse digital filtering and modem conversion transformations on digital signals en route between said center and said trunk, and means coupled to said memory arrays for configuring portions of said data storing array as circular buffers such that each buffer is allocatable to an interface to a time channel of said trunk and can be used concurrently to sustain both modem and digital filtering transformations relative to data held therein.

13. A communication system in accordance with claim 8 including means for selectively handling signals representing digitized speech or sound data; said means including means for applying compression and decompression conversions to said signals whereby said signals can be stored in a compressed form at said center and transmitted over said trunk in decompressed form.

14. A communication system in accordance with claim 8 including means for selectively handling signals representing digitized video image data; said means including means for applying decompression and compression conversions to said data whereby said data is handled is decompressed form at said center and in compressed form over said trunk.

* * * * *